(12) United States Patent
Shiohara

(10) Patent No.: US 7,630,547 B2
(45) Date of Patent: Dec. 8, 2009

(54) IMAGE QUALITY DISPLAY APPARATUS, DIGITAL CAMERA, DEVELOPING DEVICE, IMAGE QUALITY DISPLAY METHOD, AND IMAGE QUALITY DISPLAY PROGRAM

(75) Inventor: Ryuichi Shiohara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 637 days.

(21) Appl. No.: 11/076,025

(22) Filed: Mar. 10, 2005

(65) Prior Publication Data
US 2005/0237410 A1 Oct. 27, 2005

(30) Foreign Application Priority Data
Mar. 10, 2004 (JP) .......................... P.2004-067276
Oct. 8, 2004 (JP) .......................... P.2004-296176

(51) Int. Cl.
*G06K 9/00* (2006.01)
(52) U.S. Cl. ..................................................... 382/168
(58) Field of Classification Search ........................ None
See application file for complete search history.

(56) References Cited

U.S. PATENT DOCUMENTS

| | | | | |
|---|---|---|---|---|
| 5,515,450 A | * | 5/1996 | Takeo et al. | 382/132 |
| 5,724,456 A | * | 3/1998 | Boyack et al. | 382/274 |
| 5,990,957 A | * | 11/1999 | Ryoo | 375/240.03 |
| 6,058,210 A | * | 5/2000 | de Queiroz et al. | 382/232 |
| 6,262,817 B1 | * | 7/2001 | Sato et al. | 358/518 |
| 6,823,089 B1 | * | 11/2004 | Yu et al. | 382/268 |
| 6,845,176 B1 | * | 1/2005 | Sezan | 382/168 |
| 6,888,552 B2 | * | 5/2005 | Debevec et al. | 345/589 |
| 7,151,566 B2 | * | 12/2006 | Hattori et al. | 348/254 |
| 7,176,965 B1 | * | 2/2007 | Noguchi | 348/222.1 |
| 7,257,261 B2 | * | 8/2007 | Suh | 382/236 |
| 7,352,813 B2 | * | 4/2008 | Kim | 375/240.25 |
| 2004/0179131 A1 | * | 9/2004 | Honda et al. | 348/362 |

FOREIGN PATENT DOCUMENTS

| | | | | |
|---|---|---|---|---|
| JP | 09093438 A | * | 4/1997 | |
| JP | 2001-268400 A | | 9/2001 | |
| JP | 2002247364 A | * | 8/2002 | |

OTHER PUBLICATIONS

Ramacher et al, "Single-Chip Video Camera with Multiple Integrated Functions", 1999 IEEE international Solid-State Circuits Conf., Feb. 17, 1999.*

Mathematics for Engineers, Second Edition, Pearson Education Limited, Anthony Croft and Robert Davison, Sections 4.3-4.4.*

* cited by examiner

*Primary Examiner*—Yuzhen Ge
(74) *Attorney, Agent, or Firm*—Sughrue Mion, PLLC

(57) ABSTRACT

An image quality display apparatus includes an input means for inputting images, an operating means for accepting a request for display of a graph showing a frequency distribution of shading levels of an image inputted by the input means, a display means for displaying the graph in response to the display request, and a tallying means for preparing data for displaying the graph before accepting the display request.

17 Claims, 17 Drawing Sheets

FIG. 7

| SECTION REPRESENTATIVE VALUE (LOGARITHMIC SCALE) | SECTION RANGE (LINEAR SCALE) | SECTION WIDTH (LINEAR SCALE) |
|---|---|---|
| 0.0 | 255 | |
| -0.2 | 222-254 | 33 |
| -0.4 | 193-221 | 29 |
| -0.6 | 168-192 | 25 |
| -0.8 | 146-167 | 22 |
| -1.0 | 128-145 | 18 |
| -1.2 | 111-127 | 18 |
| -1.4 | 97-110 | 14 |
| -1.6 | 84-96 | 13 |
| -1.8 | 73-83 | 11 |
| -2.0 | 64-72 | 9 |
| -2.2 | 55-63 | 9 |
| -2.4 | 48-54 | 7 |
| -2.6 | 42-47 | 6 |
| -2.8 | 36-41 | 6 |
| -3.0 | 32-35 | 4 |
| -3.2 | 27-31 | 5 |
| -3.4 | 24-26 | 3 |
| -3.6 | 21-23 | 3 |
| -3.8 | 18-20 | 3 |
| -4.0 | 15-17 | 3 |
| -4.2 | 14 | 1 |
| -4.4 | 12-13 | 2 |
| -4.6 | 10-11 | 2 |
| -4.8 | 9 | 1 |
| -5.0 | 8 | 1 |
| -5.2 | 7 | 1 |
| -5.4 | 6 | 1 |
| -5.6 | 5 | 1 |
| -5.8 | | |
| -6.0 | 4 | 1 |
| -6.2 | | |
| -6.4 | 3 | 1 |
| -6.6 | | |
| -6.8 | | |
| -7.0 | 2 | 1 |
| -7.2 | | |
| -7.4 | | |
| -7.6 | | |
| -7.8 | | |
| -8.0 | 1 | 1 |
| -8.2 | 0 | 1 |

BEFORE ADJUSTMENT

AFTER ADJUSTMENT

AFTER ADJUSTMENT

BEFORE ADJUSTMENT

FIG. 19

| SECTION REPRESENTATIVE VALUE (LOGARITHMIC SCALE) | SECTION RANGE (LINEAR SCALE) |
|---|---|
| 0.00 | 255 |
| -0.02 | 252-254 |
| -0.04 | 249-251 |
| -0.06 | 245-248 |
| -0.08 | 242-244 |
| -0.10 | 238-241 |
| -0.12 | 235-237 |
| -0.14 | 232-234 |
| ⋮ | ⋮ |
| -2.48 | 46 |
| ⋮ | ⋮ |

IMAGE QUALITY DISPLAY APPARATUS, DIGITAL CAMERA, DEVELOPING DEVICE, IMAGE QUALITY DISPLAY METHOD, AND IMAGE QUALITY DISPLAY PROGRAM

BACKGROUND OF THE INVENTION

The present invention relates to an image quality display apparatus, a digital camera, a developing device, an image quality display method, and an image quality display program.

Generally, a digital camera has been known which displays a frequency distribution of the shading levels such as image luminance values or pixel values of each of R, G, B channels by a graph of a histogram or the like (for example, refer to Patent Document 1). In addition, an image processing program which makes a display apparatus of a personal computer to display such a graph has also been known. According to such a graph showing the frequency distribution of the shading levels of an image, for example, a user can confirm whether the exposure conditions of the image taken by the digital camera are correct.

However, in the digital camera described in Patent Document 1, frequencies are tallied after a histogram display request is accepted. Therefore, according to the digital camera described in Patent Document 1, it takes time until the histogram is displayed since the display request is accepted.

Furthermore, generally, shading levels of an image are expressed by 8 bits and indicate color tones of 256 colors of 0 through 255 on a linear scale. Conventionally, the frequency distribution tallied by dividing the 256 grades of 0 through 255 of the shading levels on a linear scale at equal intervals is displayed in a histogram with a section axis set on the horizontal axis of a linear scale as described in Patent Document 1.

It is said that the general sensation of a human being follows Weber's Law, and the sensation of brightness correlating to the shading levels of an image also follows Weber's Law. According to the Weber-Fechner Law that was developed from Weber's Law, the relationship between a level of sensation and an amount of physical stimulus is expressed by the following formula.

$$S = k \times \log I + c$$

Herein, S indicates a level of sensation, I indicates an amount of physical stimulus, and k and c are constants. From this formula, the sensation of brightness of a human being can be approximated by a logarithmic function.

An exposure value (EV) indicating exposure conditions is regulated by the following formula.

$$2^{EV} = F^2/t$$

Herein, F indicates an F number showing a stop of a camera, and t is an exposure period (unit: second). As expressed by this formula, the exposure value is expressed by a logarithmic function. Generally, many objects concentrate in the range of an exposure difference of 5EV. By adjusting the exposure conditions so that the shading levels distribute in the range of approximately ±2.5EV around a luminance value corresponding to 18% reflecting light, correct tone expression of the object becomes possible. However, the exposure value is expressed by a logarithmic function as described above, and each stage of the f numbers and exposure periods is designed so as to correspond to ⅓EV in general cameras. Therefore, when luminance values of an image are expressed by a histogram with a section axis that is a linear scale, it is difficult to intuitively adjust exposure conditions based on the histogram. Namely, although it is possible that the exposure conditions are recognized from the luminance value histogram with a section axis of a linear scale, such a histogram is hardly used as indexes to be used for exposure correction. In detail, even if a luminance value histogram with a section axis of a linear scale is displayed, it is difficult to know how the distribution of luminance values of an image showing an object correspond to the range of an exposure difference of 5EV, so that it is also difficult to know whether the image is imaged with correct exposure, and furthermore, it is also very difficult to judge whether ⅓EV plus correction or ⅔EV minus correction should be applied to obtain correct exposure. For example, in the histogram with a linear scale as a section axis, as shown in FIG. 17A and FIG. 17B, the entire shape of the histogram greatly changes depending on exposure conditions when the same object is imaged by adjusting exposure conditions in EV units, so that it is difficult that the shape after adjusting the exposure conditions is estimated before adjusting the exposure conditions. (Herein, FIG. 17A and FIG. 17B are histograms when the same object is imaged by adjusting the exposure conditions in EV units in the same imaging environment.) Therefore, it is difficult to judge whether luminance values correctly distribute in the range of an exposure difference of 5EV and intuitively know how much adjustment in EV units the exposure value needs to obtain an optimum luminance value distribution.

Patent Document 1: Japanese Published Unexamined Patent Application No. 2001-268400

SUMMARY OF THE INVENTION

The invention was made in view of the above-mentioned problem, and an object thereof is to provide an image quality display apparatus, a digital camera, a developing device, an image quality display method and an image quality display program which shorten a response time to a request for display of a frequency distribution of image shading levels.

An image quality display apparatus for achieving the above-mentioned object, comprises: an input means which inputs an image; an operating means which accepts a request for display of a graph showing a frequency distribution of shading levels of an image inputted by the input means; a display means which displays the graph in response to the display request; and a tallying means which tallies data for displaying the graph before accepting the display request. By preparing data for displaying a graph before accepting a request for display of a graph showing a frequency distribution of shading levels of an image, the response time to the graph display request can be shortened.

Preferably, the operating means accepts the display requests for a plurality of images inputted by the input means in a predetermined order, and the tallying means prepares data for displaying the graphs in the predetermined order. By accepting graph display requests in a predetermined order such as a recording order of images, in a condition where a graph for a certain image is displayed, an image of a graph display request for which is accepted next to the image is predetermined. Therefore, the data for displaying graphs are prepared in order of acceptance of the display requests, whereby a storage capacity required for storing the data can be reduced in advance.

Preferably, the tallying means prepares data for displaying the graph in a mode that can directly shift to a mode for displaying the graph. In a mode that can directly shift to a mode for displaying a graph showing a frequency distribution of shading levels of an image, data for displaying this graph is prepared, whereby a storage capacity required for storing the data can be reduced in advance.

Preferably, the tallying means prepares data for displaying the graph based on a frequency distribution of shading levels of an image obtained by reducing the size of an original image. By preparing data for displaying a graph showing a frequency distribution of shading levels of an original image based on a frequency distribution of shading levels of an image the number of pixels of which is smaller than that of the original image, the time for tallying the frequency distribution can be shortened, and the capacity of a memory to be used for displaying the graph can be reduced.

Preferably, the graph has a section axis of a logarithmic scale. By showing a frequency distribution of shading levels of an image by a graph having a section axis of a logarithmic scale, the distribution frequency of the shading levels of the image can be displayed so that a user can easily intuitively understand it, judge whether the exposure conditions are correct or not and adjust the exposure conditions easily.

Preferably, in the graph, sections are set at equal intervals on a logarithmic scale. By showing a frequency distribution of shading levels of an image by a graph having sections set at equal intervals on a logarithmic scale, the distribution frequency of the shading levels of the image can be displayed so that a user can easily intuitively understand it, judge whether the exposure conditions are correct or not and adjust the exposure conditions easily.

Preferably, the tallying means tallies frequencies of shading levels of an image inputted by the input means for each of the sections set at equal intervals on a logarithmic scale. Preferably, the tallying means comprises: a first tallying means for tallying frequencies of shading levels of an image inputted by the input means for each of the sections set at equal intervals on a linear scale; and a second tallying means for tallying frequencies, tallied for each section by the first tallying means, for each of the sections set at equal intervals on a logarithmic scale.

Preferably, the graph has graduations of a logarithmic scale on the section axis. By the graduations on the logarithmic scale of the section axis, a frequency distribution becomes more understandable.

Preferably, the display means displays an image inputted by the input means and the graph so as to overlap each other on one screen. By displaying an image and a graph so as to overlap each other, the image and the graph can be displayed largely within one screen.

Preferably, the display means displays an image inputted by the input means and the graph so as to be positioned side by side on one screen. By displaying an image and a graph side by side, the graph is not placed over the image, and this makes it easy for a user to confirm the image.

Preferably, the graph shows frequencies of sections by areas of regions corresponding to the sections.

Preferably, the graph shows frequencies of sections by heights of graphic elements corresponding to the sections. Preferably, the graph indicates sections corresponding to representative values of shading levels of an image taken under correct exposure conditions. By indicating sections corresponding to representative values of the shading levels of an image taken under correct exposure conditions, it becomes easier for a user to judge whether exposure conditions are correct or not and to adjust the exposure conditions.

A digital camera for achieving the above-mentioned object comprises; an imaging means which prepares an image by photoelectric conversion based on an optical image of an object; a storing means which stores an image outputted from the imaging means; an operating means which accepts a request for display of a graph showing a frequency distribution of shading levels of an image stored in the storing means; a display means which displays the graph in response to the display request; and a tallying means which prepares data for displaying the graph before accepting the display request. By preparing data for displaying a graph before accepting a request for display of the graph showing a frequency distribution of shading levels of an image, the response time to the graph display request can be shortened.

A developing device for achieving the above-mentioned object comprises: an input means which inputs an image by RAW data; a developing means which converts an image data format inputted by the input means into a standardized data format; an operating means which accepts a request for display of a graph showing a frequency distribution of shading levels of an image inputted by the input means; a display means which displays the graph in response to the display request; and a tallying means which prepares data for displaying the graph before accepting the display request. By preparing data for displaying a graph before accepting a request for display of the graph showing a frequency distribution of shading levels of an image, the response time to the graph display request can be shortened.

An image quality display method for achieving the above-mentioned object comprises: an input step for inputting an image; an operating step for accepting a request for display of a graph showing a frequency distribution of shading levels of an image inputted in the input step; a display step for displaying the graph in response to the display request; and a tallying step for preparing data for displaying the graph before accepting the display request. By preparing data for displaying a graph before accepting a request for display of the graph showing a frequency distribution of shading levels of an image, the response time to the graph display request can be shortened.

An image quality display program for achieving the above-mentioned object makes a computer to function as: an input means which inputs an image; an operating means which accepts a request for display of a graph showing a frequency distribution of shading levels of an image inputted by the input means; a display means which displays the graph in response to the display request; and a tallying means which prepares data for displaying the graph before accepting the display request. By preparing data for displaying a graph before accepting a request for display of the graph showing a frequency distribution of shading levels of an image, the response time to the graph display request can be shortened.

BRIEF DESCRIPTION OF THE DRAWINGS

FIG. 7 is a schematic view showing a tallying table relating to the first embodiment of the invention.

FIG. 19 is a schematic view showing a tallying table relating to the first embodiment of the invention.

DETAILED DESCRIPTION OF PREFERRED EMBODIMENTS

Herein after, a best mode for carrying out the invention is described based on the embodiments.

First Embodiment

Figure 2:
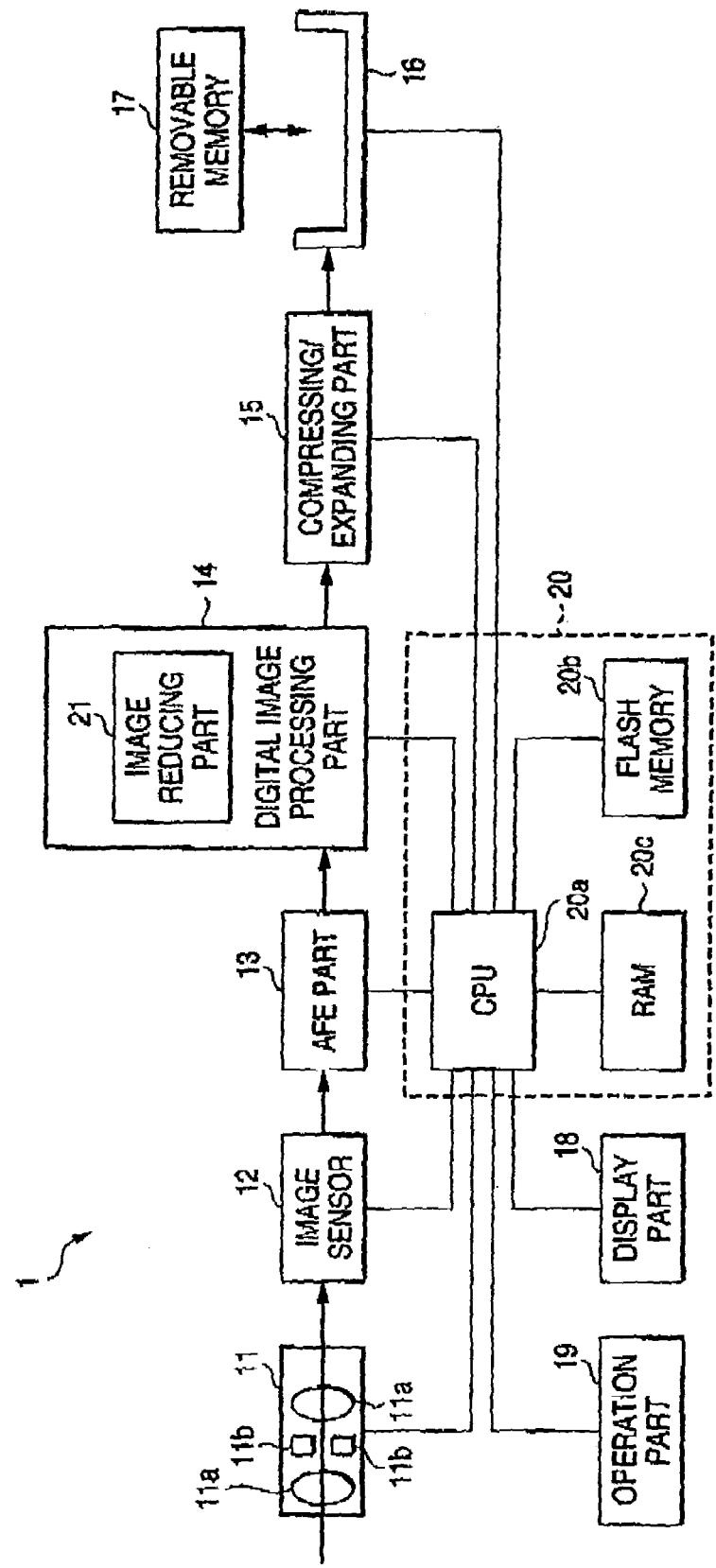
FIG. 2 is a block diagram of the digital still camera relating to the first embodiment of the invention.

FIG. 2 is a block diagram showing a hardware configuration of a digital still camera (DSC) 1 as an image quality display apparatus and a digital camera relating to a first embodiment of the invention.

The optical system 11 comprises a lens 11a and a stop 11b, etc. The optical system 11 forms an image of an object on a light receiving surface of an image sensor 12.

The image sensor 12 is an image pickup device including photoelectric converting elements arranged discretely in a two-dimensional space and a charge transfer element such as a CCD (charge coupled device), and is a so-called CCD image sensor or CMOS image sensor, etc. The image sensor 12 is driven by an unillustrated sensor controller. The image sensor 12 accumulates charges obtained by photoelectrically converting an object image formed on the light receiving surface by the optical system 11 for a predetermined period for each photoelectric converting element, and outputs electrical signals according to light receiving amounts of each photoelectric converting element. The image sensor 12 can take-in color image data by providing filters of four colors of C (cyan), M (magenta), Y (yellow), and G (green) or filters of R (red), G (green), and B (blue) on the light receiving surface. The exposure amount of the image sensor 12 is determined by the F number of the stop 11b and an opening period of an unillustrated mechanical shutter provided between the optical system 11 and the image sensor 12. The exposure period of the image sensor 12 may be adjusted by electrically controlling the charge accumulation period itself of the image sensor 12.

The analog front end (AFE) 13 quantizes electrical signals outputted from the image sensor 12 into digital signals by an AD converter and outputs these. In detail, for example, the AFE 13 carries out CDS (correlated double sampling) processing for reducing noise contained in the electrical signals, optical black clamp control for reproducing the black levels of the image, electrical signal level adjustment by adjusting the gains of the electrical signals of the image, and quantization and outputs RAW data to the digital image processing part 14. In a mode for storing the image in the RAW format, the data obtained by simply AD-converting the output of the image sensor 12 is outputted to the external storing part 16 without change.

Herein, generally, the RAW data is data digitized simply from the electrical signals outputted from the image pickup device. The RAW-format file is not predetermined by international standards like JPEG data, and the format can be freely determined. In this embodiment, together with the imaging data, image size, bit number indicating a shading level per pixel, and color filter arrangement data of the sensor generated when imaging in the camera, data digitized from CCD output signals by the AFE 13 is stored without change. Data corresponding to the sensor output stored in this RAW-format file (data simply digitized from output signals of the image sensor 12) is referred to as RAW data in this embodiment. For example, in the JPEG format, the tones of each YCbCr channel are limited to 8 bits, so that perfect reproduction is not possible even when the image pickup device captures color tones by, for example, 12 through 16 bits, and the image quality inevitably deteriorates due to lossy compression. In RAW data, neither the tone limitation of 8 bits nor lossy compression is required. Therefore, by storing the image in the RAW data, the image can be stored without reduction in data amount. Instead of data outputted from the AFE 13, the RAW data may be data subjected to, for example, a part of the processing executed by the digital image processing part 14. Furthermore, it is also possible that a reduced image in the JPEG format is attached to the RAW-format file. The RAW data cannot be displayed without image forming processing, however, by reading the reduced image in the JPEG format attached to the RAW data by a personal computer, for example, high-speed display of an object shown by the RAW data becomes possible.

The digital image processing part 14 outputs image data expressed by a YCbCr color space by applying image forming processing, white balance correction, gamma correction, and color space conversion for conversion from an RGB color space to a YCbCr color space etc., to the RAW data outputted from the AFE 13. Herein, image forming processing means processing for forming a color image having shading levels of three primary colors of R, G, and B for each pixel by complementing the shading levels of pixels acquired for only one color based on accumulated charges of the photoelectric converting elements that receive light transmitted through a specific color filter among adjacent pixels.

The digital image processing part 14 has an image reducing part 21. The image reducing part 21 reduces the size of the image, and outputs a size-reduced image (hereinafter, referred to as a reduced image). The image size of the reduced image is set by the control part 20. For example, when an image stored in the removable memory 17 is displayed on the screen of the LCD (Liquid Crystal Display) 18a, the image is displayed by being reduced in size to the screen size of the LCD 18a by the image reducing part 21. Of course, it is possible for the image reducing part 21 to reduce the image to other sizes. The reduced image generated by the image reducing part 21 is outputted to the removable memory 17 by being associated with the original image by the external storing part 16. The processing for reducing the image may be executed by a program that is executed in CPU 20a.

The compressing/expanding part 15 compresses the image data outputted from the digital image processing part 14, and expands the compressed image data. In detail, the compressing/expanding part 15 applies compression using the JPEG format as a lossy compression method or compression using a loss less compression method that does not involve data truncation. The compressing/expanding part 15 is constructed so as to be able to convert the image data into image data in the TIFF format without compression. The compressing/expanding part 15 may do nothing or may apply lossless-compression to the RAW data in the mode for storing the image in the RAW format. Hereinafter, an example of compression and expansion according to the JPEG standards in the compressing/expanding part 15 is described.

The external storing part 16 has a card slot for connection to a removable memory 17 as a storing means, and a memory controller, etc. The external storing part 16 is controlled by the control part 20, and writes the image data compressed by the compressing/expanding part 15 and the RAW data outputted from the AFE part 13 on the removable memory 17 and reads these data stored in the removable memory 17.

The display part 18 has an LCD 18a(see FIG. 3A), a display controller for controlling the LCD 18a, and so on. The display part 18 is controlled by the control part 20 and displays various menus, images and graphs on the LCD 18a. In the reproduction mode, based on image data read from the removable memory 17 by the external storing part 16 and expanded by the compressing/expanding part 15, the original image or the reduced image generated by the image reducing part 21 is displayed on the LCD 18a by the display part 18.

The operating part 19 includes a shutter button, a dial switch for setting exposure conditions and other various imaging conditions, a plurality of push button switches for operating various menus to be displayed, and a jog dial, etc.

The control part 20 includes a CPU 20a, a flash memory 20b, and a RAM 20c as a storing unit. The CPU 20a controls the entirety of the DSC 1 by executing programs stored in the flash memory 20b, The CPU 20a also functions as an input unit, an imaging unit, a storing unit, an output unit, and a tallying unit by executing an image quality display program stored in the flash memory 20b. The flash memory 20b is a memory for storing various programs and data Various programs and data to be stored in the flash memory 20b may be downloaded via a network from a predetermined server, or may be readout from a computer-readable storage medium such as a removable memory, etc., and stored. The RAM 20c is a memory for temporarily storing various programs and data.

In this embodiment, the "imaging unit" mentioned in the Claims corresponds to the optical system 11, the image sensor 12, the AFE 13, the digital image processing part 14, and the control part 20. The "input unit" mentioned in the Claims means the external storing part 16 and the control part 20, the optical system 11, the image sensor 12, the AFE 13, and the digital image processing part 14. The "operating unit" mentioned in the Claims corresponds to the display part 18, the operating part 19, and the control part 20. The "display unit" mentioned in the Claims corresponds to the display part 18 and the control part 20. The "tallying unit" mentioned in the Claims corresponds to the control part 20.

Next, the external appearance of the DSC 1 is described.

Figure 3:
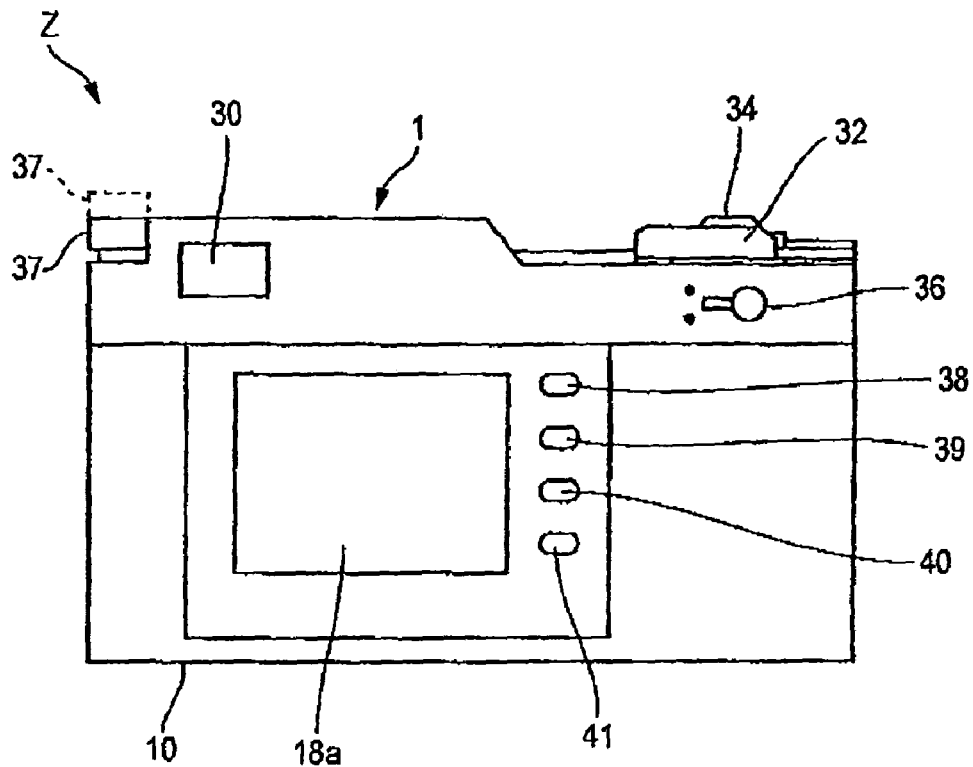
FIG. 3A is a back view of the digital still camera relating to the first embodiment of the invention.
FIG. 3B is a top view of the same.
Figure 3:
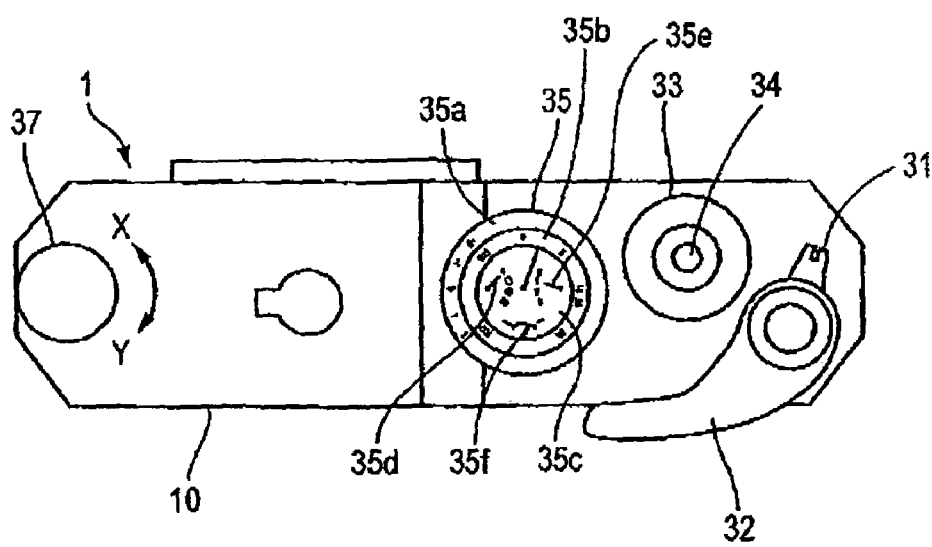

FIG. 3A is a back view of the DSC 1, and FIG. 3B is a top view from the Z direction shown in FIG. 3A.

The optical finder 30 is used by a user for viewing an object.

The switch 31, the winding lever 32, the dial switch 33, the shutter button 34, the rotary dial 35a, the jog dial 37, the display switch 38, the menu switch 39, the enter switch 40, and the cancel switch 41 compose the operating part 19.

The switch 31 is a power supply switch. The winding lever 32 is provided for winding the shutter curtain up and mechanically fixing it so that the next shutter operation of the shutter curtain is enabled again after the shutter is mechanically released. A user enables an imaging operation of the mechanical shutter by shutter charging by winding the winding lever 32 up before imaging. The dial switch 33 is a rotary switch for selecting and setting a shutter speed or imaging conditions. The shutter button 34 is set at the center of the dial switch. 33. The imaging operation is started by depressing the shutter button 34.

The outer circumference of the needle type display device 35 set next to the dial switch 33 is formed into a rotating dial 35a, and can adjust the exposure value by each ⅓EV from −2EV to +2EV. On the fixed ring 35b provided inside the rotating dial 35a, the remaining number of images that are capable of being imaged is displayed. On the dial plate 35c provided inside the fixed ring 35b, the white balance, data format, and remaining battery level indicating graduations that indicate the battery remaining level are indicated. The data format is indicated by a letter R indicating the RAW format, a letter T indicating the TIFF format, a letter H indicating the JPEG format with a high compression ratio, and a letter N indicating the JPEG format with a low compression ratio. The currently selected item and remaining battery level are indicated by the indicating needles 35d, 35e, and 35f. When the jog dial 37 rotates while the lever switch 36 is diagonally right up or down, the white balance or data format can be changed according to the posture of the lever switch 36.

The jog dial 37 is provided so as to be rotatable in the XY directions and movable in the axis direction of the rotation axis. The jog dial 37 is provided so as to be rotatable at two positions in the axis direction. In the description given below, the side close to the casing 10 of the DSC 1 is defined as a lower position, and the position at which the jog dial 37 is raised from the lower position is defined as an upper position. In FIG. 3A, the jog dial 37 at the lower position is shown by a solid line, and the jog dial 37 at the upper position is shown by a dashed line. A user performs various settings and function selection by combining the switches and the jog dial 37.

On the right of the LCD 18a, the display switch 38, the menu switch 39, the enter switch 40, and the cancel switch 41 are arranged.

Next, the image quality display program is described.

Figure 4:
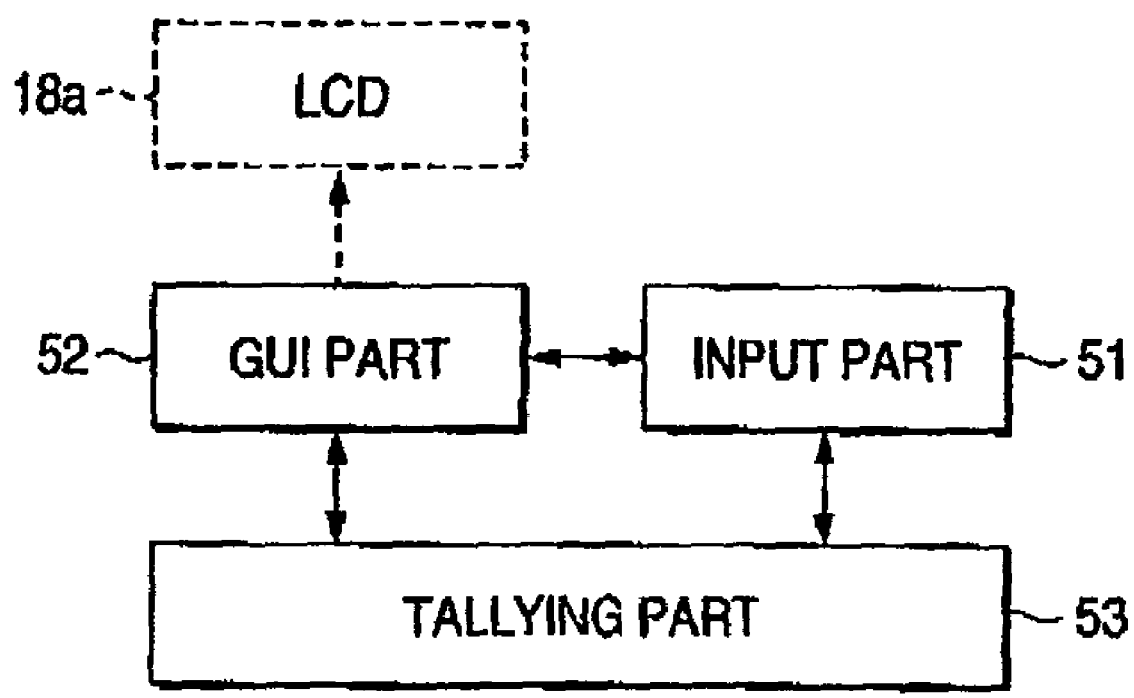
FIG. 4 is a block diagram of the image quality display program relating to the first embodiment of the invention.

FIG. 4 is a block diagram showing logical configuration of the image quality display program. The image quality display program includes an input part 51 for making the DSC 1 to function as an input means, a GUI part 52 for making the DSC 1 to function as an operating means and a display means, and a tallying part 53 for making the DSC 1 to function as a tallying means.

When the input part 51 inputs an image showing an object, the input part 51 converts the object image into image data by controlling the parts of the DSC 1 and stores the converted image data in the RAM 20c. Furthermore, when the input part 51 inputs an image stored in the removable memory 17, the input part reads image data from the removable memory 17 into the RAM 20c by controlling the external storing part 16. The input part 51 may input an image by downloading data from other devices via a network interface.

The GUI part 52 provides a GUI (Graphical User Interface) for operating the DSC 1 by a user. In detail, the GUI part 52 displays various menus, an image stored in the removable memory 17, and a histogram of the image, etc., on the LCD 18a according to output signals from the operating part 19.

Figure 5:
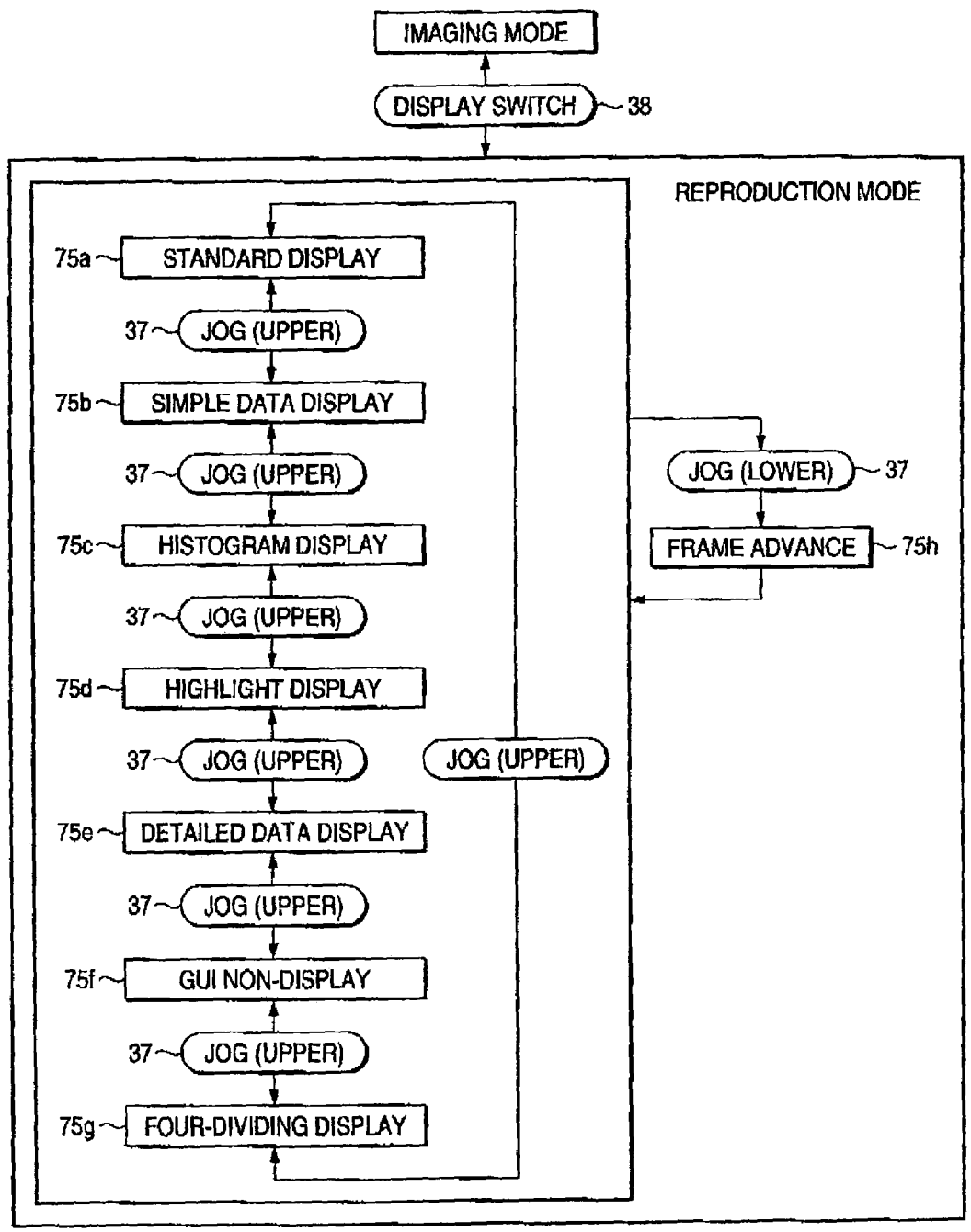
FIG. 5 is a schematic view showing the GUI of the digital still camera relating to the first embodiment of the invention.

FIG. 5 is a schematic view for describing the GUI of the DSC 1. When the power supply is turned on, the DSC 1 is actuated and shifts to an imaging mode. The imaging mode is a mode for imaging. When the shutter button 34 is depressed in the imaging mode, the input part 51 starts an operation for imaging the object image, applies various processing to signals outputted from the image sensor 12, and generates image data showing the object image. When the display switch 38 is depressed in the imaging mode, the mode is shifted to a reproduction mode.

The reproduction mode is a mode for displaying an image stored in the removable memory 17 on the LCD 18a. When the jog dial 37 is at the lower position in the reproduction mode, image files stored in the removable memory 17 are selected in a predetermined order in response to an operation for rotating the jog dial 37 by a user (75h). When an image file is selected, an image stored in the selected image file is displayed on the LCD 18a. The order of selection of the image files is an ascending order or descending order of file names including serial numbers provided in order of imaging to the image files when imaging. Namely, the order of selection of the images is the order of imaging of the images when the jog dial 37 is rotated clockwise, and it becomes reverse to the imaging order when the jog dial 37 is rotated counterclockwise. The order of selection of the images may be the order of imaging dates instead of the order of image file names.

In the reproduction mode, the reduced image, the original image, or various attached data relating to the original image stored in the currently selected file are displayed. In detail, for example, a plurality of reproduction modes are available, including standard display 75a, simple data display 75b, histogram display 75c, highlight display 75d, detailed data display 75e, GUI non-display 75f, and four-dividing display 75g. When a user rotates the jog dial 37 at the upper position, the GUI part 52 displays the reduced image, the original image, or attached data according to the rotation.

In a specific reproduction mode in which a specific image file is selected, when the jog dial 37 rotates at the lower position, an image file that is previous or next in order is newly selected (75h), and a reduced image, an original image, or attached data of the newly selected image file is displayed in the same reproduction mode.

In the standard display 75a, a reduced image or an original image and the "image number total number of images" are composite-displayed on one screen. When a specific image file is selected, the GUI part 52 may display an original image after displaying a reduced image first. Likewise, in other reproduction modes for displaying an image, the GUI part 52 may display an original image after displaying a reduced image first when a specific image file is selected.

In the simple data display 75b, a reduced image or an original image, a current "image number total number of images," a file number, imaging quality, file protection, and an imaging date are displayed on one screen.

In the histogram display 75c, a reduced image or an original image, a current "image number total number of images," and a histogram are displayed on one screen. The method of displaying the histogram is described later. In the histogram display 75c, it is allowed that only a histogram is displayed on one screen without displaying an image.

In the highlight display 75d, a white-out portion of a reduced image or an original image is displayed on a reduced image.

In the detailed data display 75e, a reduced image or an original image, a current "image number total number of images," a file number, imaging quality, file protection, an imaging date, a file number, a shutter speed, white balance (WB), a resolution, an ISO sensitivity, and film settings are displayed on one screen.

In the GUI non-display 75f, only a reduced image or an original image is displayed.

In the four-dividing display 75g, reduced images of four image files with serial image numbers are displayed in four-divided regions of one screen.

The tallying part 53 shown in FIG. 4 outputs data showing a frequency distribution of shading levels of an image to the GUI part 52. The tallying part 53 prepares this data based on an original image or a reduced image of a currently selected image file or an image file that is previous or next to the image file before a display request is accepted.

Figure 6:
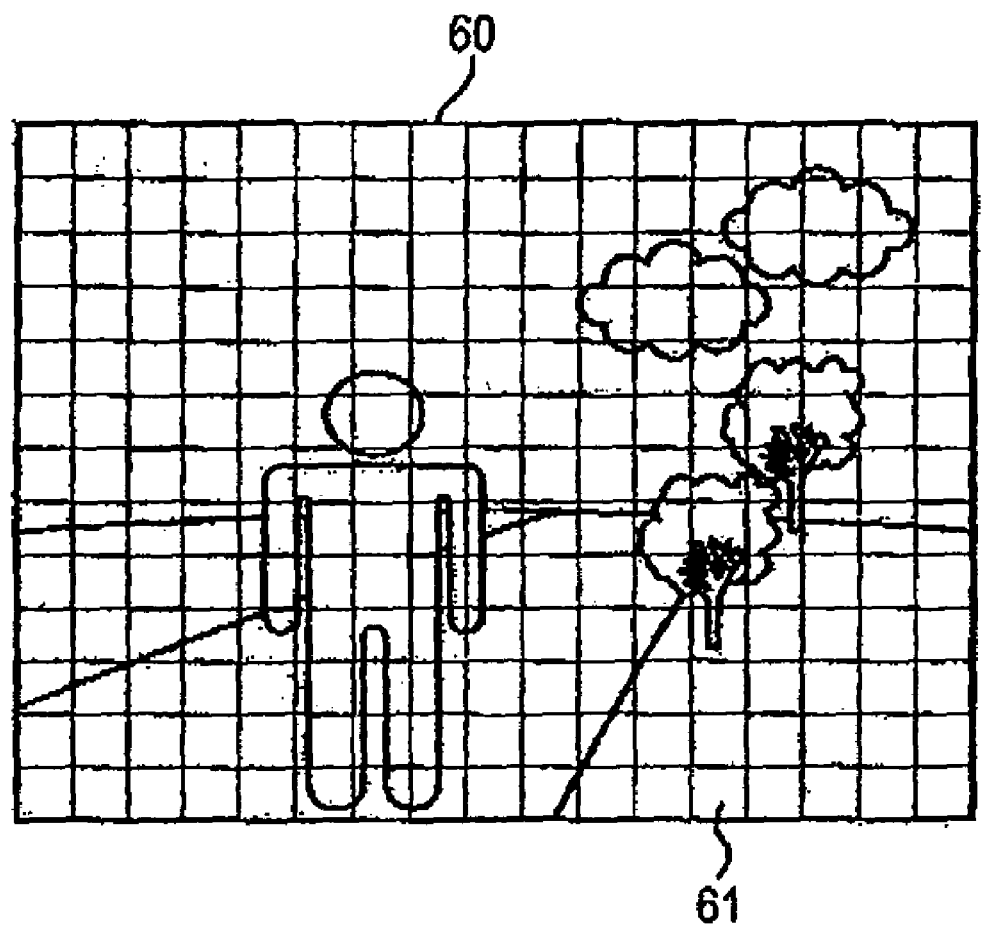
FIG. 6 is a schematic view of an image relating to the first embodiment of the invention.

FIG. 6 is a schematic view showing an example of an image to be scanned for preparing the data for displaying a histogram. In the first embodiment, image data in the JPEG format is described as an example. Image data in the JPEG format is image data expressed by a YCbCr color space, and pixels 61 are composed by three tone values showing shading levels of channels of Y (luminance components), Cb (blue components), and Cr (red components). In this embodiment, in order to show the shading levels of the luminance components of the image 60 as a histogram, the tallying part 53 tallies the frequency distribution of luminance components of the image 60. In this specification, the shading level indicated by the luminance component is referred to as a luminance value. As to an image expressed by tone values of RGS, the GUI part 52 may indicate a frequency distribution of shading levels of an image for tone values of R, G, or B. In addition, it is also possible that pixel values of a specific channel are set as tallying targets, that is, for example, only pixel values of the G channel are tallied.

In the first embodiment, in order to shorten the data preparation time, data for displaying a histogram is prepared based on a reduced image, and based on this data, a histogram showing luminance values of the original image is displayed. Frequencies in the respective sections are tallied based on the reduced image, whereby the time required to carry out processing for displaying a histogram becomes shorter than in the case where frequencies are tallied based on an image before being reduced.

Data for displaying a histogram may be prepared based on an original image, and in the tallying part 53, data for displaying a histogram may be prepared based on an image that has been reduced in size so as to fit the display screen size to make displaying on the screen size of the LCD 18a easy. Alternatively, the data may be prepared based on an image obtained by reducing the original image to a size that is different from that of the original image and the display image. In detail, for example, histogram data may be prepared for an original image of 3008×2000, or alternatively an original image may be reduced to the size of 640×425 that makes displaying on the screen size of the LCD 18a easy and data for displaying a histogram is prepared based on the reduced image. Alternatively, an original image may be reduced to ⅛ vertically and horizontally to generate a reduced image of 376×250, and data for displaying a histogram is prepared based on the reduced image of 376×250. If the reduction ratio is correct, a histogram displayed based on the reduced image and a histogram displayed based on the original image roughly match each other in shape, so that by displaying the histogram based on the reduced image, histogram display processing can be increased in speed without losing the function of the histogram.

In image data in the JPEG format, DC components are recorded for each block of 8 pixels×8 pixels and the DC components correspond to representative luminance values of the respective blocks. Therefore, by extracting only the DC components when expanding the JPEG and forming an image by the extracted DC components, the same effect as in the processing of reducing the original image to ⅛ vertically and horizontally can be obtained. Therefore, when an image is formed by DC components extracted when expanding the JPEG, and a histogram is displayed based on the image, the histogram display processing can be further increased in speed.

The tallying part 53 tallies a frequency distribution of luminance values of an image by setting sections at equal intervals on a logarithmic scale. The tallying table 65 shown in FIG. 7 is a table for making correspondence between sections of a histogram set at equal intervals on a logarithmic scale and luminance values of an image expressed by a linear scale. In each line of the tallying table 65, a section representative value of the logarithmic scale and a section range of the linear scale are set. In the tallying table 65 of FIG. 7, a luminance value (x) of the linear scale and a luminance value (EV) of the logarithmic scale are made correspondent to each other by the following formula.

$$EV = Log_2(x/255)$$

In the tallying table 65, sections are set in the range of 0.0 to −8.2 on a logarithmic scale. 0.0 on the logarithmic scale corresponds to a maximum luminance value, and −8.2 on the logarithmic scale corresponds to a minimum luminance value. When the minimum value 0 of the luminance value on the 8-bit linear scale is expressed by using the above-mentioned formula, the minimum value 0 is −∞. The minimum luminance value in the section with a representative value of −8.2 is set to −∞ on the logarithmic scale. The level of low of the minimum section setting of the EV scale is a designing matter that can be determined depending on what degree of detail the frequency distribution in the range with low luminance values is to be displayed.

The section representative values are expedient values for showing relative exposure differences among sections, and it is a properly settable designing matter whether or not the representative value of the maximum section is indicated as 0.0. For example, to the section set in the range of 4.0 to −4.2 on the logarithmic scale, luminance values of 0 to 255 on the linear scale may be made correspondent. Furthermore, in the tallying table 65, the width of each section is set equivalent to 0.2EV, however, the manner of setting the width of each section is a properly settable designing matter. For example, the section width maybe ⅒EV, 1/20EV, ⅓EV, ⅙EV, ⅛EV, or smaller 1/30EV. Or, it may be an adequate interval which fakes the histogram finer and smoother.

FIG. 7 shows the width of the range of luminance values on the linear scale for each section for tallying frequencies, that is, the section width. For example, in the case of the section with a representative value of −0.2 on the logarithmic scale, the luminance values on the linear scale corresponding to this section are 222 through 254, so that the section width is 33. When the sections of luminance values set at equal intervals on the logarithmic scale, the correlation between the width of the linear scale of each section and the section representative value on the logarithmic scale can be approximated by a predetermined exponential function. In detail, as the section representative value of the logarithmic scale becomes larger, the section width of the linear scale becomes wider according to a predetermined exponential function.

The tallying table shown in FIG. 19 is an example in which the sections are set smaller than in the tallying table 65 of FIG. 7. To display a histogram finer than the histogram displayed based on the tallying table 65 of FIG. 7, the sections are set smaller. For example, as shown in FIG. 19, with the section settings at intervals of 0.02 on the logarithmic scale with a bottom of 2, approximately 400 sections are set in the range with the width of 8EV, so that a very fine histogram is displayed. It is a properly settable designing matter how fine the histogram to be displayed is. Generally, when a histogram is displayed in the range with a width of 8EV, a sufficiently fine histogram can be displayed with 200 sections. For example, even when sections are set at intervals of 0.04 on a logarithmic scale with a bottom of 2, a considerably fine histogram can be displayed. In this embodiment, a case where luminance values are expressed by an 8-bit linear scale is described, however, it is a matter of course that the luminance values of the linear scale can be expressed by other bit numbers such as 10 bits, 12 bits, etc. As correspondence between luminance values (EV) on the logarithmic scale and luminance values (x) on the linear scale, when the luminance value on the linear scale is expressed by 10 bits, $EV=Log_2(x/1023)$, and when the luminance value on the linear scale is expressed by 12 bits, $EV=Log_2(x4095)$. As described above, by setting the bottom of the logarithmic to 2, the scale of exposure values and the scale of luminance values can be matched with each other.

The tallying part 53 initializes the frequency of each section to 0, and then, for a luminance value of each pixel composing a reduced image, judges a section to which the pixel belongs by referring to the tallying table 65, and tallies a frequency by adding 1 to the frequency of the judged section. The frequencies thus tallied for all sections are outputted as data for displaying a histogram to the GUI part 52. The external storing part 16 may attach the data prepared by the tallying part 53 to a corresponding image file.

Instead of judging a section to which a corresponding pixel is put in by referring to the tallying table 65 for each pixel, it is also possible that the tallying table 65 is referred to after tallying frequencies in predetermined section widths on a linear scale. In detail, for example, for an image including pixels having luminance values in 256 tones from 0 to 255 on a linear scale, a frequency distribution of the luminance values is calculated by setting the section width of each section to 1 on a linear scale. Herein, sections with a section width of 1 on the linear scale are referred to as primary sections, and sections set at equal intervals on a logarithmic scale are referred to as secondary sections. Next, secondary sections corresponding to all primary sections are specified while referring to the tallying table 65, frequencies of primary sections which correspond to the same secondary section are totaled, and the totaled frequency is defined as the frequency of the secondary sections. Since determination of a frequency distribution of luminance values on a linear scale by setting all sections equal in width on the linear scale is also carried out in the related art, conventional circuits or programs can be used for the processing for determining the frequency distribution of luminance values on a linear scale by setting all sections equal in width on the linear scale.

Tallying of frequencies may be carried out for a gamma-corrected image, or may be carried out for an image that has not been gamma-corrected. In a case of a general image with gamma of 1/2.2, the relationship between a luminance value Y of the image after being gamma-corrected and a luminance value X of the image before being gamma-corrected is expressed by the following formula.

$$Y = X^{1/2.2}$$

Therefore, a luminance value EV of an image after being gamma-corrected is expressed by the following formula.

$$EV = Log_2 Y = Log_2 X^{1/2.2} = (1/2.2) \times Log_2 X$$

Therefore, a histogram of the gamma-corrected image is displayed in a shape compressed in the section axis direction by the gamma value. For example, when luminance values of an image before being gamma-corrected are displayed so as to distribute in the sections from −8EV to 0EV, luminance values of the image after being gamma corrected upon setting the gamma to 1/2.2 are displayed so as to distribute in sections from −3.64EV to 0EV. For example, when luminance values of an image before being gamma-corrected are displayed so as to distribute in sections from −5EV to 0EV, luminance values of the image after being gamma corrected upon setting the gamma to 1/2.2 are displayed so as to distribute in sections from −2.27EV to 0EV.

When the histogram display 75*c* is selected, the GUI part 52 shown in FIG. 4 displays a currently selected image and a graph showing a frequency distribution of luminance values of the image on one screen based on frequencies of all sections outputted from the tallying part 53. In detail, for example, a histogram with a horizontal axis set as a section axis of a logarithmic scale and a vertical axis set as a frequency axis of a linear scale is composite-displayed so as to overlap a reduced image on one screen.

Figure 8:
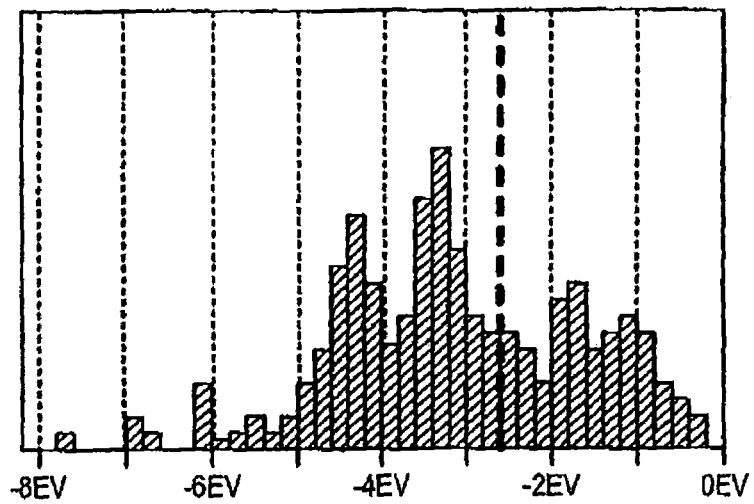
FIGS. 8A to 8C are schematic views showing a histogram relating to the first embodiment of the invention.
Figure 8:
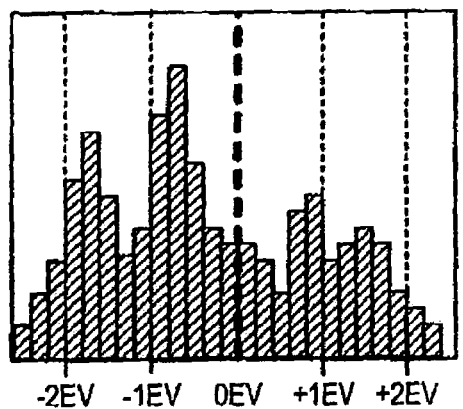
Figure 8:
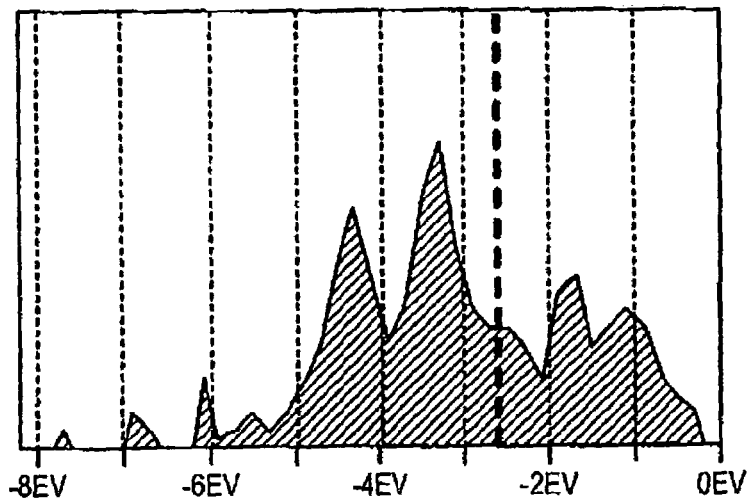

FIG. 8A, FIG. 8B and FIG. 8C are schematic views showing examples of histograms that the GUI part 52 displays on the LCD 18*a*. In the examples shown in FIG. 8A and FIG. 8B, frequencies of the sections are indicated by rectangular areas with bottoms set to the respective sections. The widths of the rectangles with the bottoms set to the sections are constant, so that the frequencies of the respective sections are also indicated by the heights of the rectangles. In the histogram shown in FIG. 8C, the frequencies of the sections are indicated by heights of sequential lines. The ratio between the heights or areas of the sections and frequencies of the sections indicated in a histogram can be set arbitrarily.

It is desirable that the GUI part 52 displays divisions of the section axis. In detail, as shown in FIG. 8A, FIG. 8B, and FIG. 8C, as divisions of the section axis, dashed lines in parallel to the frequency axis are aligned in the section axis direction. By aligning the divisions at intervals of 1 in the section axis direction, it becomes possible for a user to recognize the degrees of distribution of pixel values of the pixels in 1EV unit widths, so that exposure correction becomes easier. Furthermore, it is desirable that the dashed lines as divisions are attached with numbers indicating scales of the section axis by logarithms with the bottom of 2. By attaching divisions and numbers of the logarithmic scale with the bottom 2 to the divisions of the section axis, a user can grasp the correspondence between sections and exposure values, and can easily know, for example, what steps the exposure conditions need to be adjusted by on the EV scale to obtain proper exposure.

It is generally said that optimum exposure is a light amount of an object with a reflectance of 18%. Exposure conditions where an average and a center value as representative values of luminance values of an image correspond to this light amount are said to be proper conditions. Therefore, it is desirable that a graph that indicates a section corresponding to an average of luminance values of an image taken under correct exposure conditions is displayed. For example, as shown in FIG. 8A, FIG. 8B, and FIG. 8C, a thick-width dashed line that passes through this section and is parallel to the vertical axis is indicated. Furthermore, for example, as shown in FIG. 8B, a histogram in which the sections are set so that the section in question is positioned at the center of the horizontal axis and the central section representative value is set to 0 is displayed.

An average as a representative value of luminance values of an image, taken under correct exposure conditions is set as follows. For example, when a reflecting light of 0 to 100% is recorded by luminance values of 0 through 255, a luminance value corresponding to 18% reflecting light is 46. Therefore, when a luminance value x on a linear scale and a luminance value EV on a logarithmic scale are made correspondent to each other by EV=$Log_2$(x/255), the section of −2.47EV (=$Log_2$(46/255)) is the section corresponding to an average of luminance values of an image taken under correct exposure conditions. In addition, when reflecting light of 0 to 120% is recorded by luminance values of 0 through 255 by a digital camera that records locations up to brighter locations, a luminance value corresponding to 18% reflecting light is 38. Therefore, when a luminance value x on a linear scale and a luminance value EV on a logarithmic scale are made correspondent to each other by EV=$Log_2$(x/255), the section of −2.74EV (=$Log_2$(38/255)) is the section corresponding to the average of luminance values of the image taken under correct exposure conditions. These are examples when the gamma is 1.

When an image after being gamma-corrected upon setting the gamma to 1/2.2, a representative value of luminance values of an image taken under correct exposure conditions is calculated as follows. When reflecting light of 0 to 100% is recorded by luminance values of 0 through 255, a luminance value after gamma correction corresponding to the 18% reflecting light is 118. Therefore, when a luminance value x (before gamma correction) on a linear scale and a luminance value EV (before gamma correction) on a logarithmic scale are made correspondent to each other by EV=$Log_2$(x/255), the section of −1.2EV (=$Log_2$($0.18^{1/12.2}$) is the section corresponding to an average of luminance values of an image taken under correct exposure conditions. This is 1/2.2 times the −2.47EV that is a luminance value before gamma correction. Even when reflecting light of 0 through 120% is recorded by 0 through 255, through the same calculation, the section of −1.24EV that is a result of −2.74×1/2.2 is the section corresponding to an average of luminance values of an image taken under correct exposure conditions.

Figure 18:
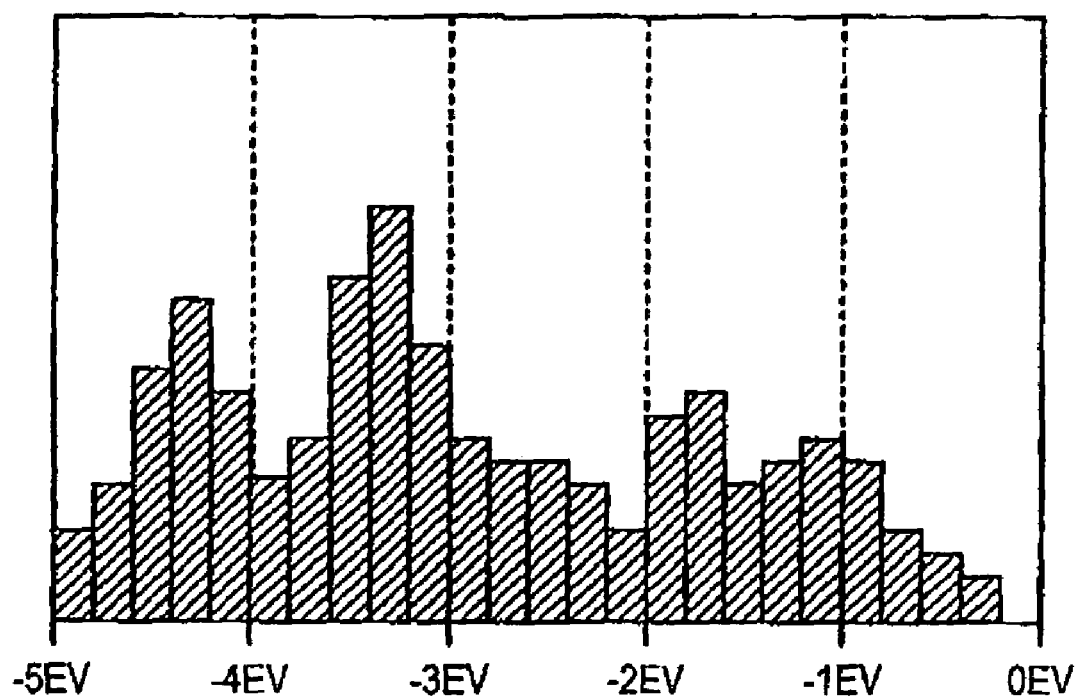
FIG. 18 is a schematic view showing a histogram relating to the first embodiment of the invention.

Instead of the letters (−8EV through 0EV) indicating exposure values attached to the divisions, gradations of a gray scale maybe displayed along the horizontal axis. The histogram does not necessarily indicate the frequency distribution of all the ranges. For example, as shown in FIG. 18, based on the results of tallying of a frequency distribution from 0.0EV to −8.2EV, a histogram may be displayed in the range from −5EV to 0EV.

Figure 9:
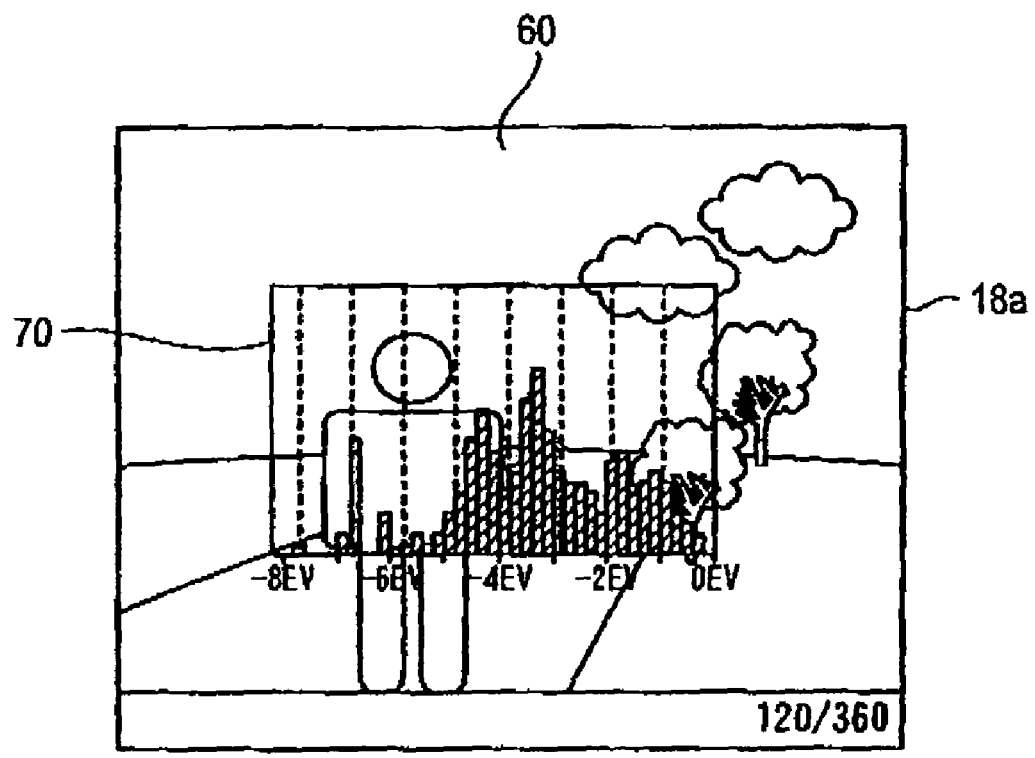
FIG. 9 is a schematic view showing a screen of a digital still camera relating to the first embodiment of the invention.

FIG. 9 is a schematic view showing a condition where a screen on which an image 60 and a histogram 70 are overlapped is displayed on the LCD 18*a*. In the first embodiment, the background of the histogram 70 is displayed transparently as shown in the figure. In detail, only components of the histogram 70 such as the rectangles showing frequencies, the vertical axis, and the horizontal axis, etc., are displayed on the image 60. With this display, even in a region corresponding to the background of the histogram 70, the image 60 can also be confirmed, so that the region of the image 60 concealed by the histogram 70 can be reduced, The GUI part 52 may display the background of the histogram 70 so as to overlap the image 60 without making the background transparent, or may display rectangles showing frequencies so as to overlap the image 60 by making the rectangles semitransparent. Desirably, for the rectangular areas in which the histogram 70 is displayed, mix composition is carried out so as to set the transmittance of the image 60 to 50% and the transmittance of the histogram 70 to 50%, and the image and histogram are composite-displayed as semitransparent.

Figure 1:
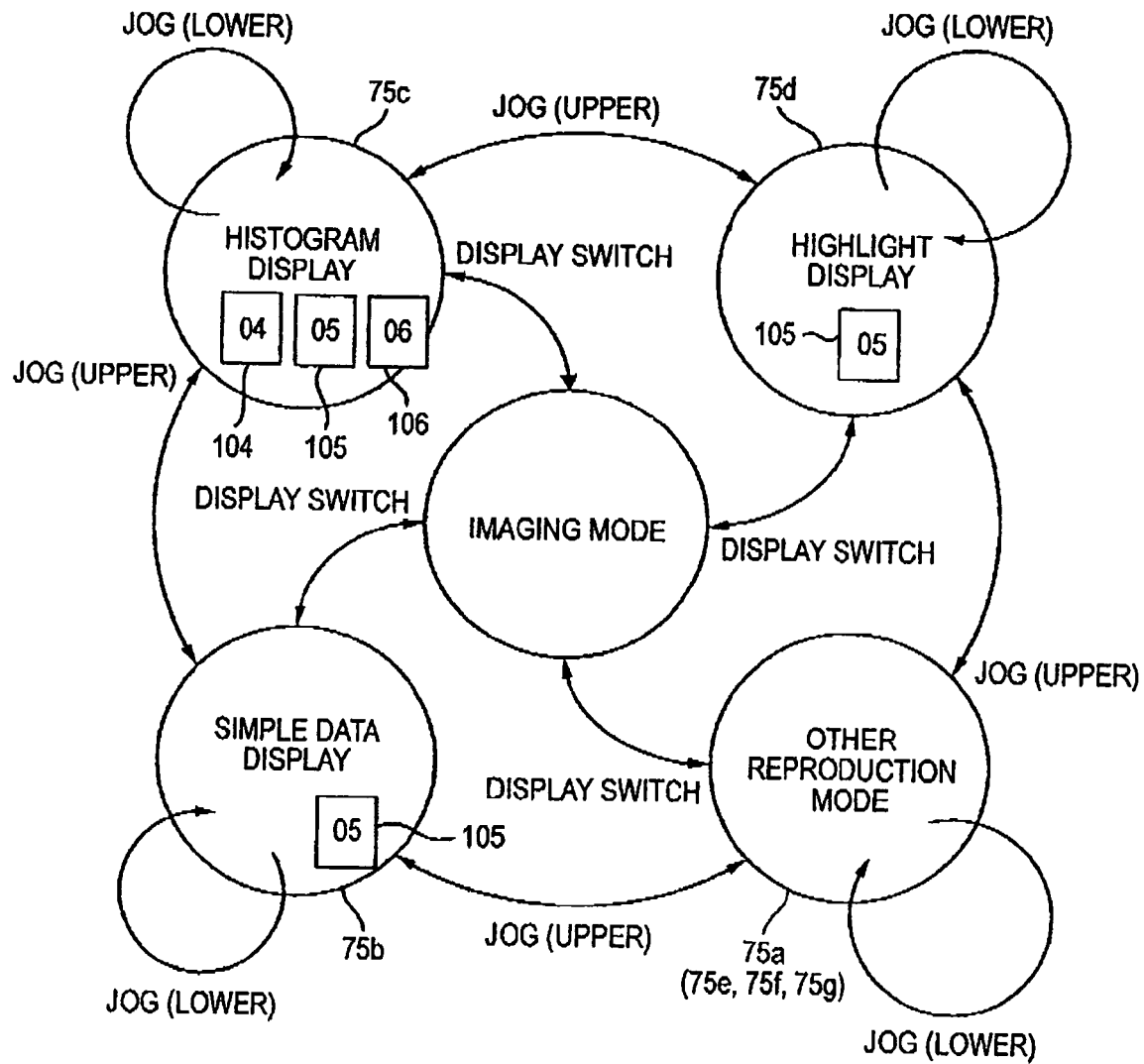
FIG. 1 is a state shifting diagram relating to the first embodiment of the invention.

FIG. 1 is a state changing diagram for describing timing for preparing data for displaying the histogram 70. The rectangles 104, 105, and 106 attached to circles showing the respective reproduction modes of the simple data display 75*b*, the histogram display 75*c*, and the highlight display 75*d* schematically indicate the state that data for displaying the histogram 70 is stored in the RAM 20*c*. The numbers "04," "05," and "06" attached to the respective rectangles 104, 105, and 106 illustrate file names of image histograms of which corresponding to the rectangles are displayed.

In the histogram display 75*c*, data 104, 105 and 106 for displaying the histogram 70 for images of a selected image file and image files that are previous or next in order are stored in the RAM 20*c*. In the highlight display 75*d* and the simple data display 75*b*, data 105 for displaying the histogram 70 for only an image of a selected image file is stored in the RAM 20*c*. These data are prepared or deleted when the reproduction mode shifts and when the selection target image is switched so that data of the above-described images in each reproduction mode of the simple data display 75*b*, histogram display 75*c*, and the highlight display are stored in the RAM 20.

Namely, in the histogram display 75*c*, before a histogram display request is accepted by rotation of the jog dial 37 at the lower position for an image previous to or next to the currently selected image, data for displaying a histogram of an image previous or next to the currently selected image, a previous image, or a next image is prepared by the tallying part 53. In the simple data display 75*b* and the highlight display 75*d*, before a histogram display request is accepted by the rotation of the jogdial 37 at the upper position for the currently selected image, data for displaying the histogram of the currently selected image is prepared.

The timing of preparing the data for displaying a histogram should be before accepting a histogram display request, and for example, data for displaying two images before and after the currently selected image, that is, a total of four histograms may be prepared. For example, data for displaying a histogram may be prepared in other reproduction modes such as the standard display 75*a*, the detailed data display 75*e*, the GUI non-display 75*f*, the four-dividing display 75*g*, etc.

According to the DSC 1 of the first embodiment of the invention described above, before a request for display of a histogram of a specific image is accepted, data for displaying the histogram of the image is prepared, so that the response time until the histogram is displayed since the display request is accepted can be shortened. Furthermore, when the reproduction mode is the histogram display 75*c*, data for displaying histograms of serial three images in the order of file names provided in advance for the images are stored in the RAM 20*c*, so that the size of the storage region for storing the data for displaying the histograms can be reduced in advance. In a reproduction mode other than the histogram display 75*c*, data for displaying a histogram is prepared only in the simple data display 75*b* and the highlight display 75*d* that can directly shift to the histogram display 75*c*, the size of the storage region for storing the data can be reduced in advance.

Furthermore, by indicating the frequency distribution of luminance values of an image by a histogram with a section axis of a logarithmic scale, the frequency distribution of the luminance values shown by the histogram and the frequency distribution of luminance values that a user sensations by viewing the image almost match each other. Therefore, it is easy for a user to intuitively understand the frequency distribution shown by the histogram according to the first embodiment by his/her sensation of brightness that a user is possible to feel when viewing an image. Furthermore, since an image and a histogram showing a frequency distribution of luminance values thereof are displayed on one screen, the histogram and the image can be compared with each other on one screen, and the meaning of the frequency distribution shown by the histogram can be easily understood. Therefore, according to the DSC 1, a frequency distribution of luminance values of an image can be displayed in an easily understandable manner for a user.

Figure 10:
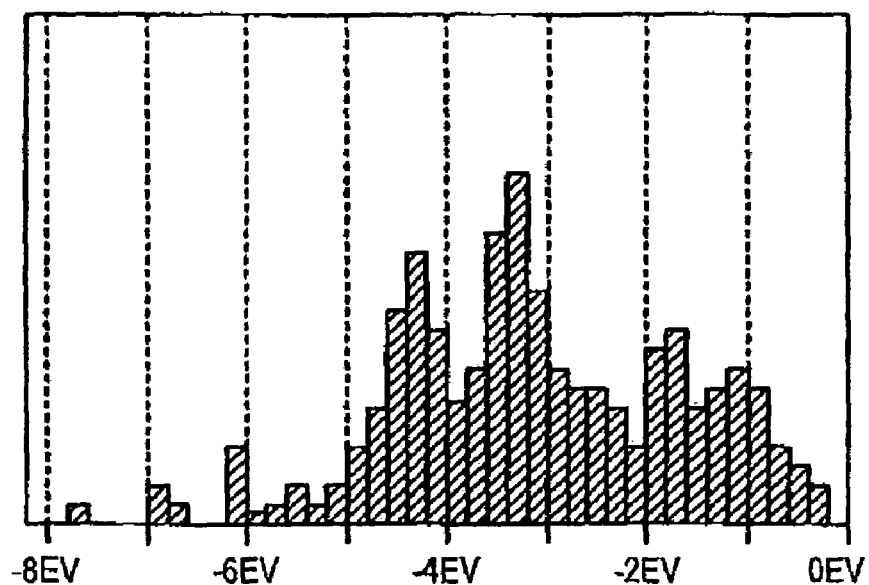
FIGS. 10A and 10B are schematic views showing a histogram relating to the first embodiment of the invention.
Figure 10:
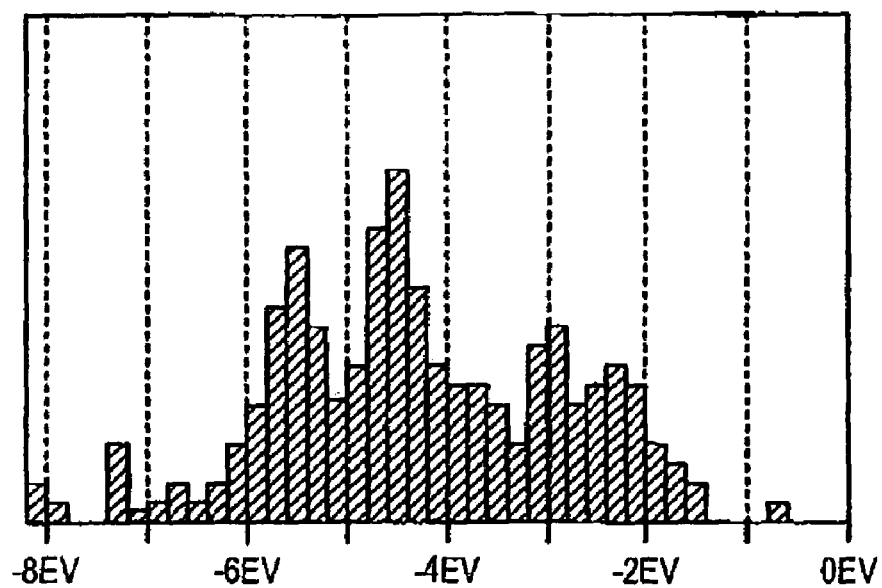

When a histogram with a section axis of a logarithmic axis is displayed, the same object is imaged in the same environment by adjusting exposure conditions, and a histogram is displayed based on the taken image, the histogram only moves to the left or right as shown in FIG. 10A and FIG. 10B and does not change in shape before and after adjusting the exposure conditions. This point in that the histogram shape does not change even if the exposure conditions are changed when the same object is imaged is a great advantage of the section axis as a logarithmic scale. Therefore, a user can intuitively adjust the exposure conditions so that luminance values after adjustment distribute in a specific range based on a histogram before adjustment. Therefore, the user can easily take an image in properly adjusted exposure conditions. Furthermore, a user can intuitively recognize how much the exposure conditions should be changed to realize proper imaging in a case where he/she takes an improper image.

Furthermore, graduations are provided for the section axis on a logarithmic scale with a bottom of 2, and numerals of the scale equal to the exposure values are attached to the graduations, whereby a user can recognize the sections and exposure values by making these directly correspondent to each other, so that exposure condition adjustment becomes easier. In detail, when correct exposure conditions are obtained by moving the histogram in parallel to the section axis direction by the width W of the graduations of the section axis, a user can take an image of an object in correct exposure conditions only by adjusting the exposure value of the digital camera so as to change by W.

In the first embodiment, the case where images are inputted from the removable memory 17 is described as an example, however, images may be inputted by using an optical system 11, an image sensor 12, and an AWE 13. In this case, the LCD 18*a* is used as an electronic view finder, and a through image and a histogram thereof are displayed as moving pictures before the shutter button 34 is depressed, or are displayed as still images by half shutter. When a histogram is displayed before the shutter button 34 is depressed, a user can adjust exposure conditions before taking an image by viewing the histogram, so that trial image taking for confirming the exposure conditions is not necessary. Therefore, convenience for users is improved.

Furthermore, in the first embodiment, as an image quality display apparatus and a digital camera, the DSC 1 is described as an example, however, the image quality display apparatus maybe a personal computer, PDA (Personal Digital Assistants), an electronic album apparatus, or the like. The digital camera maybe a digital video camera, a cell phone with a digital camera, a PDA with a digital camera, or the like.

Furthermore, in the first embodiment, a graph in which the section widths are set at equal intervals on a logarithmic scale and the section axis is a logarithmic scale is illustrated, however, it is also possible that a graph in which the section widths are set at equal intervals on a linear scale and the section axis is a linear scale is displayed.

Second Embodiment

Figure 11:
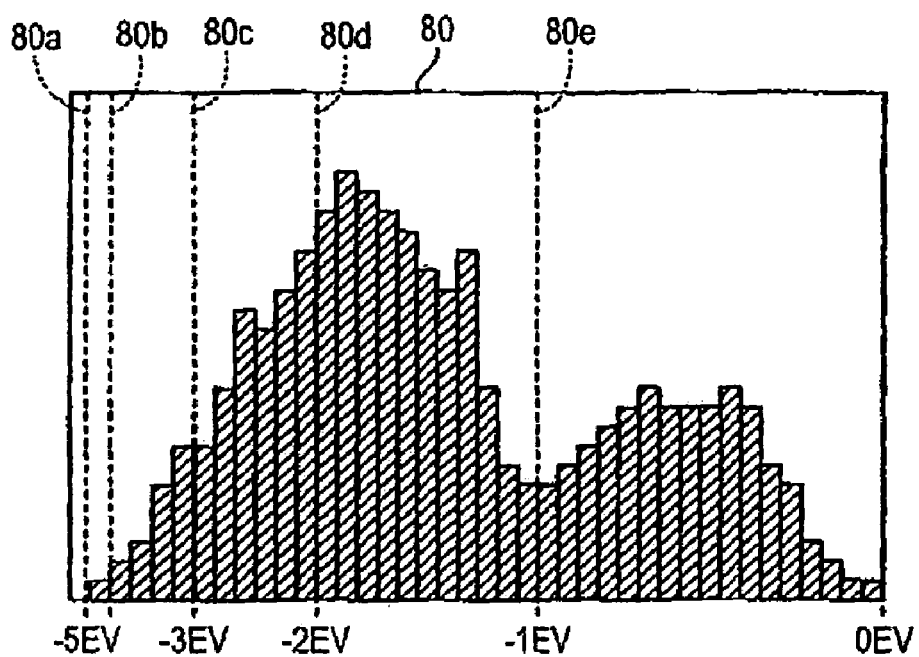
FIG. 11 is a schematic view showing a histogram relating to the second embodiment of the invention.

FIG. 11 is a schematic view showing a histogram of a second embodiment. In a digital camera of the second embodiment, in the histogram that has section widths constant on a linear scale and is displayed based on a fixed frequency distribution table, graduations of the section axis are displayed at equal intervals on a logarithmic scale, whereby a frequency distribution having sections set at equal intervals on a linear scale and a frequency distribution having sections set at equal intervals on a logarithmic scale are displayed in one histogram 80. The second embodiment is substantially the same as the first embodiment in other points.

In the second embodiment, regarding an inputted image, frequencies of the respective luminance values on a linear scale are tallied, and the tallied frequencies of the respective luminance values are totaled for each of the sections set at equal intervals on a linear scale. For example, it is assumed that the section widths are set to 8 on a linear scale and 0 through 255 are divided at equal intervals into 32 sections. In this case, for the first section, frequencies of luminance values of 0 to 7 are totaled. For the next section, frequencies of luminance values of 8 to 15 are totaled. The same applies to other sections. As a result, frequencies for each section with a width of 8 on a linear scale are tallied. Of course, it is also possible that the section widths are set to 1 on a linear scale and a frequency distribution of 256 sections from 0 to 255 is tallied for an image the luminance values of which are expressed by 8 bits.

Illustration by setting the intervals of the dashed lines 80a, 80b, 80c, 80d, and 80e as graduations of a logarithmic scale to 0.2EV increases the number of dashed lines and results in complicated illustration, so that in the second embodiment, the intervals of the dashed lines 80a, 80b, 80c, 80d, and 80e are set to 1EV and illustrated. Since the intervals of the dashed lines 80a through 80e are 1 on a logarithmic scale, the dashed lines 80a through 80e indicate sections with a width of 1 on a logarithmic scale for a user. Namely, by totaling the areas of the rectangles sandwiched by adjacent dashed lines, a user can recognize the frequencies of luminance values of each of the sections with a width of 1 on a logarithmic scale.

Third Embodiment

Figure 12:
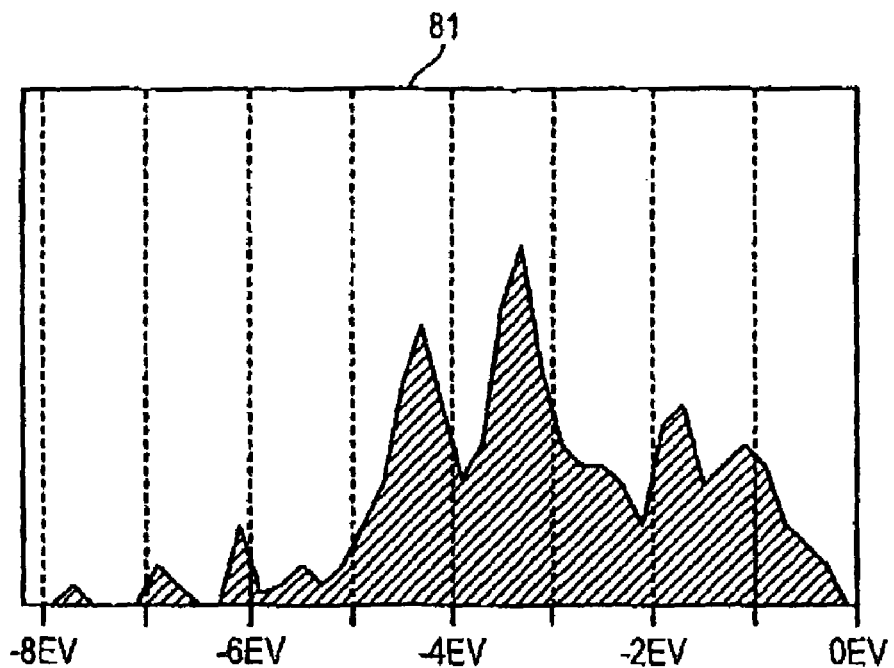
FIG. 12 is a schematic view showing a sequential line graph relating to the third embodiment of the invention.

FIG. 12 is a schematic view showing a graph of a third embodiment. In the third embodiment, in place of the histogram of the first embodiment, a sequential line graph 81 shows the frequency distribution of luminance values of an image.

The third embodiment is substantially the same as the first embodiment in other points. In the sequential line graph 81, the region between the sequential lines may be shaded or not be shaded. It is also possible that no contour line is shown and a shaded figure having a contour a part of which corresponds to the sequential line is displayed.

Fourth Embodiment

Figure 13:
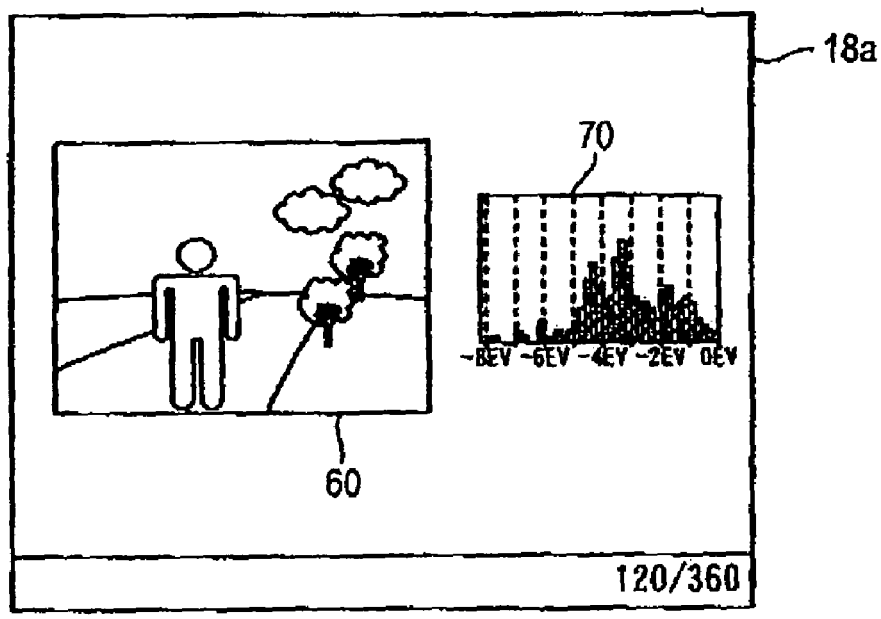
FIG. 13 is a schematic view showing a screen of a digital still camera relating to the fourth embodiment of the invention.

FIG. 13 is a schematic view showing composite-display of an image and a histogram. As shown in the figure, in the fourth embodiment, the image 60 and the histogram 70 are composite-displayed side by side on one screen without overlapping. The fourth embodiment is substantially the same as the first embodiment in other points. The method of placing the image 60 and the histogram 70 side by side is a correctly selectable designing matter.

According to the fourth embodiment, since the image and the histogram are not overlapped with each other, the image is displayed smaller than in the first embodiment, however, the entirety of the image 60 and the entirety of the histogram 70 can be displayed on one screen. Furthermore, according to the fourth embodiment, since the image 60 and the histogram 70 do not overlap each other, the dashed lines as graduations showing the 1EV unit widths are clearly seen, so that a user can accurately recognize the amount of adjusting the exposure conditions while accurately grasping the luminance value distribution data.

Fifth Embodiment

Figure 14:
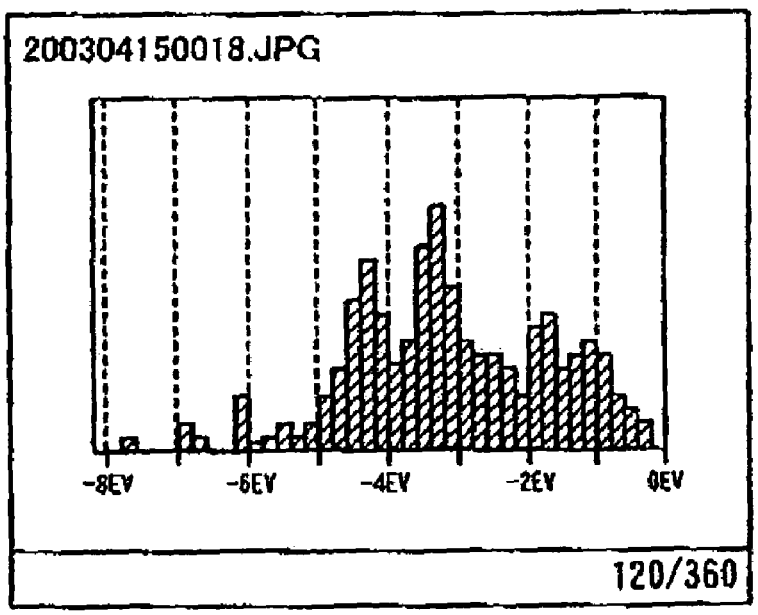
FIG. 14 is a schematic view showing a screen of a digital still camera relating to the fifth embodiment of the invention.

FIG. 14 is a schematic view showing a histogram singly. As shown in the figure, in the fifth embodiment, a histogram is displayed singly. The fifth embodiment is substantially the same as the first embodiment in other points. According to the fifth embodiment, a histogram is not displayed in a manner in that the histogram and an image are side by side or overlap each other, so that the histogram can be displayed largely and easily visible. According to the fifth embodiment, since an image and a histogram are not overlapped with each other, dashed lines as graduations showing 1EV unit widths become easily visible, so that a user can grasp the amount of adjusting the exposure conditions while accurately grasping the luminance value distribution data.

The same amendments as in 84 and 85 of 9009 are necessary.

Sixth Embodiment

Figure 15:
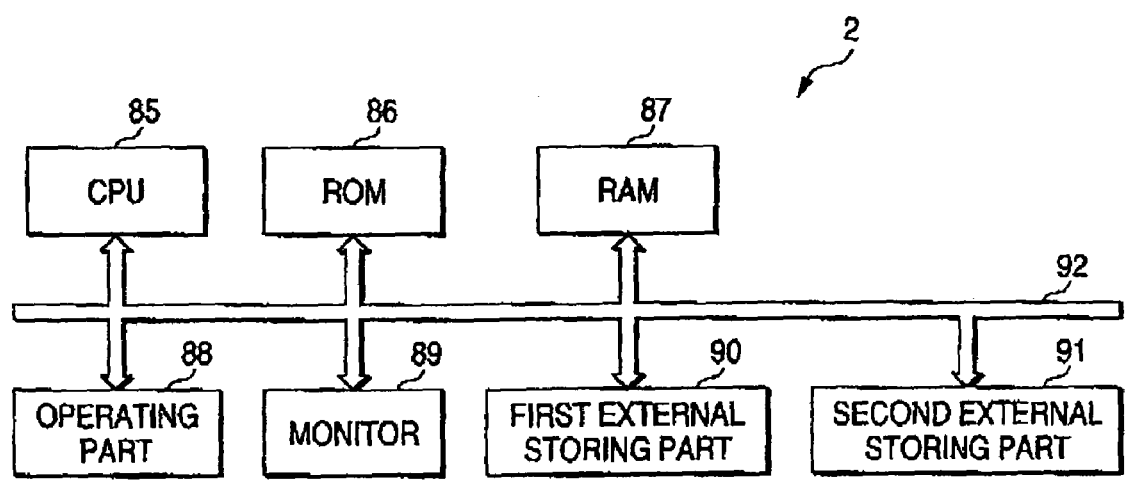
FIG. 15 is a block diagramed developing device relating to the sixth embodiment of the invention.

FIG. 15 is a block diagram showing a hardware configuration of a personal computer (PC) 2 as a developing device of a sixth embodiment. The PC 2 includes a CPU 85, a ROM 86, a RAM 87, an operating part 88, a monitor 89, a first external storing part 90, and a second external storing part 91, and these are connected to each other by a bus 92. The operating part 88 includes a mouse and a keyboard, etc. The monitor 89 includes a display such as a CRT or an LCD and a display controller, etc., and functions as a display means. The first external storing part 90 includes a hard disk and a hard disk controller, etc., and stores an operating system (OS), an image quality display program of the sixth embodiment, a tallying table, and other various programs and data. The second external storing part 91 is a storage device that uses a removable storage medium such as a flexible disk, a removable memory, a CD-ROM, and a CD-R, etc., and functions as an input means by reading image data (RAW data) in the RAW format from a storage medium. Herein, description is given by using a removable memory as an example of a removable storage medium. The CPU 85 controls the entirety of the PC 2 by executing programs stored in the ROM 86 or the first external storing part 90. The CPU 85 also functions as an input means, an operating means, a tallying means, a developing means, and a display means by executing the image quality display program. The ROM 86 is a memory that stores various programs and data in advance, and the RAM 87 is a memory for temporarily storing various programs and data. These various programs and data may be inputted by being downloaded from a predetermined server via a communications network, or may be inputted by being read out of a removable memory.

Next, an image quality display program of the sixth embodiment is described.

Figure 16:
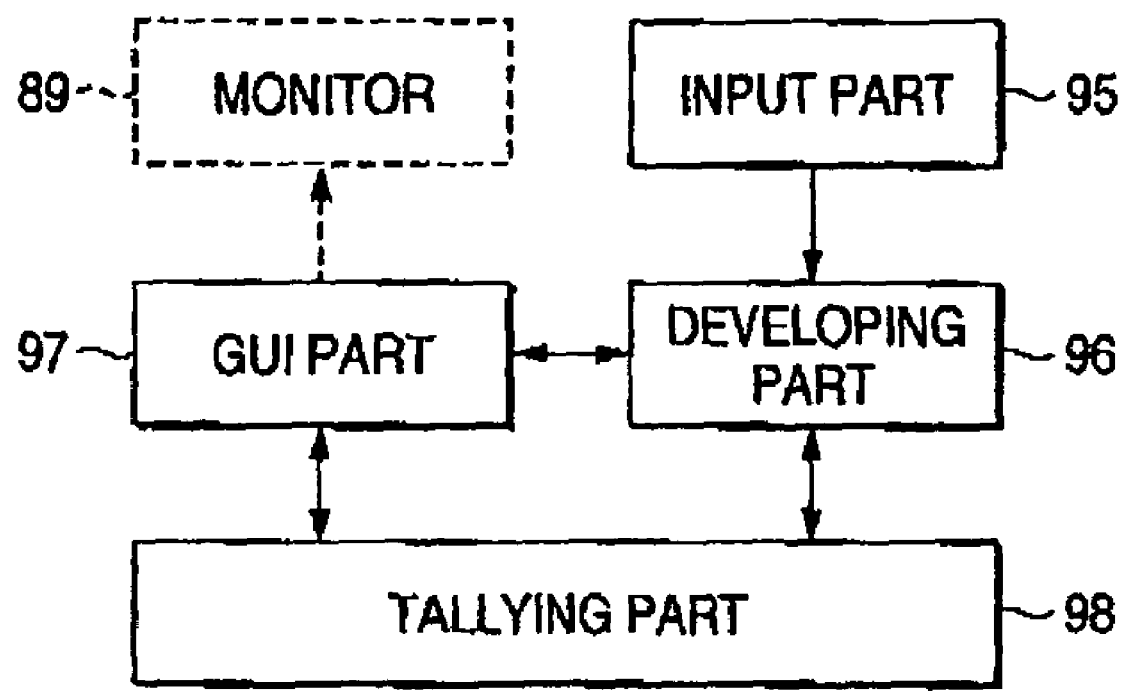
FIG. 16 is a block diagram of an image quality display program relating to the sixth embodiment of the invention.
Figure 17:
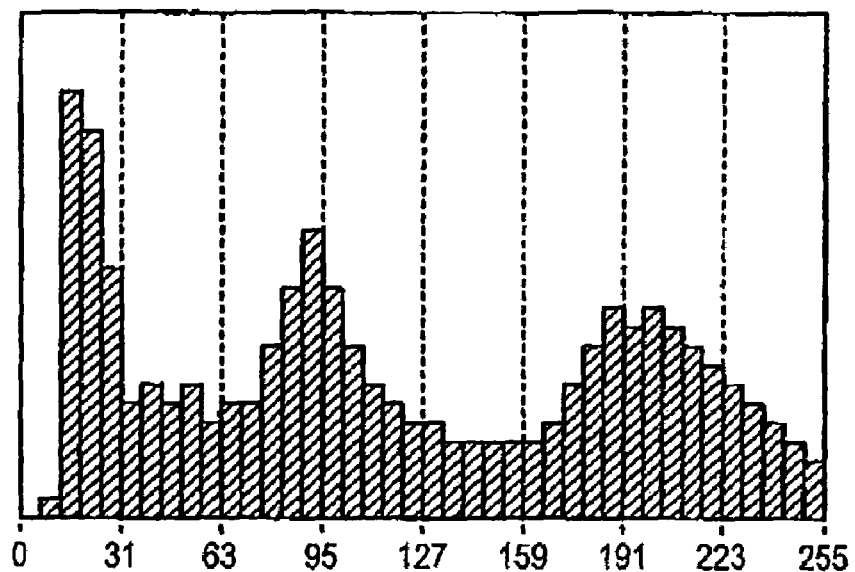
FIGS. 17A and 17B are schematic views showing a conventional histogram.
Figure 17:
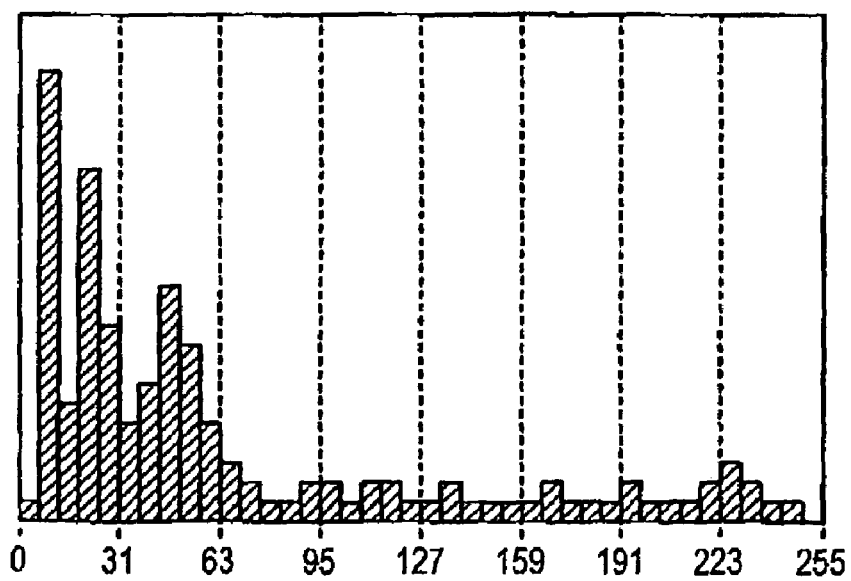

FIG. 16 is a block diagram showing a logical configuration of the image quality display program. The image quality display program of the sixth embodiment includes an input part 95, a developing part 96, a GUI part 97, and a tallying part 98. The input part 95 inputs an image in the RAW data format stored in the removable memory by controlling the second external storing part 91. The developing part 96 converts the data format of the inputted image into a standardized data format. In detail, image forming processing, gamma correction, and color space conversion are applied to RAW data and an image is formed in the standardized data format. Detailed examples of the standardized data format are the bit map data format, the JPEG data format, the TIFF data format, etc., having three tone values of RGS or YCbCr for each pixel. The GUI part 97 provides various GUI and prepares data for displaying a histogram in a timing according to the first embodiment, so that it calls the tallying part 98 in response to a predetermined operation. The tallying part 98 and the GUI part 97 composite-display an image and a graph on one screen by applying the same processing as in the first embodiment to the image outputted from the developing part 96. Furthermore, it is also possible that a histogram of an image is displayed by directly referring to image data in a non-standardized format.

According to the PC 2 of the sixth embodiment, a frequency distribution of shading levels of an object image inputted by RAW data can be displayed in man easily understandable manner for a user.

What is claimed is:

1. An image quality display apparatus comprising:
   an input unit that inputs a first image and a second image which is to be selected subsequent to the first image, in a JPEG format;
   an operating unit that accepts a display request for displaying a graph showing a frequency distribution of shading levels of the second image;
   a display unit that displays the graph in response to the display request; and
   a tallying unit that prepares data for displaying the graph based on DC components extracted when the second image in the JPEG format is expanded,
   wherein:
   the tallying unit prepares the data of the second image when the first image is selected,
   an average value of gray scale levels of an image picked up under a proper exposure condition is set,
   the graph includes a section that corresponds to the average value and that is positioned at a center of a horizontal axis of the graph,
   the graph includes a line passing through a center of the section and being parallel with a longitudinal axis of the graph, and
   a value corresponding to the center of the section is 0.

2. The image quality display apparatus according to claim 1, wherein the tallying unit prepares the data in a first mode that can directly shift to a second mode for displaying the graph based on the prepared data.

3. The image quality display apparatus according to claim 1, wherein the tallying unit prepares data for displaying the graph based on a frequency distribution of shading levels of an image obtained by reducing the size of an original image.

4. The image quality display apparatus according to claim 1, wherein the graph has a section axis of a logarithmic scale.

5. The image quality display apparatus according to claim 4, wherein the tallying unit tallies frequencies of shading levels of an image inputted by the input unit for each of the sections set at equal intervals on a logarithmic scale.

6. The image quality display apparatus according to claim 4, wherein the tallying unit includes:
   a first tallying unit for tallying frequencies of shading levels of an image inputted by the input unit for each of the sections set at equal intervals on a linear scale; and
   a second tallying unit for tallying frequencies, tallied for each section by the first tallying unit, for each of the sections set at equal intervals on a logarithmic scale.

7. The image quality display apparatus according to claim 4, wherein the graph has graduations of a logarithmic scale on the section axis.

8. The image quality display apparatus according to claim 1, wherein in the graph, sections are set at equal intervals on a logarithmic scale.

9. The image quality display apparatus according to claim 8, wherein the tallying unit tallies frequencies of shading levels of an image inputted by the input unit for each of the sections set at equal intervals on a logarithmic scale.

10. The image quality display apparatus according to claim 8, wherein the tallying unit includes:
    a first tallying unit for tallying frequencies of shading levels of an image inputted by the input unit for each of the sections set at equal intervals on a linear scale; and
    a second tallying unit for tallying frequencies, tallied for each section by the first tallying unit, for each of the sections set at equal intervals on a logarithmic scale.

11. The image quality display apparatus according to claim 8, wherein the graph has graduations of a logarithmic scale on the section axis.

12. The image quality display apparatus according to claim 1, wherein the display unit displays an image inputted by the input unit and the graph so as to overlap each other on one screen.

13. The image quality display apparatus according to claim 1, wherein the display unit displays an image inputted by the input unit and the graph so as to be positioned side by side on one screen.

14. The image quality display apparatus according to claim 1, wherein the graph shows frequencies of sections by areas of regions corresponding to the sections.

15. The image quality display apparatus according to claim 1, wherein the graph shows frequencies of sections by heights of graphic elements corresponding to the sections.

16. The image quality display apparatus according to claim 1, wherein the graph indicates sections corresponding to representative values of shading levels of an image taken in correct exposure conditions.

17. A digital camera comprising:
    an imaging unit that prepares a first image and a second image which is to be selected subsequent to the first image by photoelectric conversion based on optical images of objects;
    a storing unit that stores the first image and the second image prepared by the imaging unit in a JPEG format;
    an operating unit that accepts a display request for displaying a graph showing a frequency distribution of shading levels of the second image stored in the storing unit;
    a display unit that displays the graph in response to the display requests; and
    a tallying unit which prepares data for displaying the graph based on DC components extracted when the second image in the JPEG format is expanded,
    wherein:
    the tallying unit prepares the data of the second image when the first image is selected,
    an average value of gray scale levels of an image picked up under a proper exposure condition is set,
    the graph includes a section that corresponds to the average value and that is positioned at a center of a horizontal axis of the graph,
    the graph includes a line passing through a center of the section and being parallel with a longitudinal axis of the graph, and
    a value corresponding to the center of the section is 0.

* * * * *